US007077259B2

(12) United States Patent
Breidenbach

(10) Patent No.: US 7,077,259 B2
(45) Date of Patent: Jul. 18, 2006

(54) CARTON TRANSFER UNIT

(75) Inventor: Thomas S. Breidenbach, Maple Grove, MN (US)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 11/099,961

(22) Filed: Apr. 6, 2005

(65) Prior Publication Data

US 2005/0172572 A1 Aug. 11, 2005

Related U.S. Application Data

(62) Division of application No. 10/763,893, filed on Jan. 23, 2004.

(51) Int. Cl.
*B65G 47/84* (2006.01)
*B65B 61/18* (2006.01)

(52) U.S. Cl. ................................ 198/474.1; 198/476.1

(58) Field of Classification Search ............ 198/469.1, 198/470.1, 473.1, 474.1, 475.1, 476.1
See application file for complete search history.

(56) References Cited

U.S. PATENT DOCUMENTS 3,310,149 A * 3/1967 Vadas et al. ................ 198/378
3,331,186 A * 7/1967 Braun ......................... 53/565
3,378,128 A * 4/1968 Stevenson, Jr. et al. .... 198/378
3,712,449 A 1/1973 Holovnia et al.
3,890,765 A * 6/1975 Farfaglia et al. .............. 53/563
4,456,118 A * 6/1984 Kauffman et al. ....... 198/462.1
4,588,391 A * 5/1986 Evans et al. ................ 493/165
4,590,740 A * 5/1986 Rodocker .................... 53/426
4,718,882 A * 1/1988 Bressler et al. ............. 493/164
4,805,758 A * 2/1989 Dominico et al. .......... 198/444
5,191,964 A * 3/1993 Spisak et al. ............... 198/447
5,492,592 A 2/1996 Bergholtz et al.
5,579,625 A * 12/1996 Olson et al. ................. 53/48.1
5,867,966 A * 2/1999 Mogard ..................... 53/133.2
5,927,474 A * 7/1999 Owen et al. ............. 198/475.1

(Continued)

FOREIGN PATENT DOCUMENTS

EP 0 935 522 9/1997

(Continued)

OTHER PUBLICATIONS

Notification of Transmittal of the International Search Report dated Jun. 6, 2005.

*Primary Examiner*—Douglas Hess
(74) *Attorney, Agent, or Firm*—Levenfeld Pearlstein, LLC

(57) ABSTRACT

A transfer unit is configured for use with a form, fill and seal packaging machine. The transfer unit receives a partially erected carton from a first station in a tubular form, conveys the carton to a second station, and conveys the carton from the second station to a third station. The transfer unit includes a hub defining a longitudinal hub axis and configured for rotational movement about the hub axis. A plurality of car pairs are mounted to the hub for longitudinal movement along the hub. Each of the car pairs includes first and second cars, each of which has first and second mandrels mounted thereto. The mandrels are configured to receive a partially erected carton. Each mandrel has a mandrel axis and is rotational about its respective axis. The mandrel axes are perpendicular and tangential to the hub axis. A drive longitudinally moving the car pairs along the hub and rotationally moves the mandrels about their respective mandrel axes, about 90 degrees, between an untwisted position and a twisted position.

8 Claims, 18 Drawing Sheets

U.S. PATENT DOCUMENTS

| | | | | |
|---|---|---|---|---|
| 6,012,267 | A | 1/2000 | Katsumata | |
| 6,467,238 | B1 | 10/2002 | Lees et al. | |
| 6,536,187 | B1 | 3/2003 | Lees et al. | |
| 6,629,403 | B1 * | 10/2003 | Tisma | 53/502 |
| 6,817,969 | B1 * | 11/2004 | Hermodsson et al. | 493/163 |

FOREIGN PATENT DOCUMENTS

| | | |
|---|---|---|
| EP | 0 978 471 | 7/1999 |
| GB | 920146 | 3/1963 |
| WO | 00/20194 | 4/2000 |

* cited by examiner

CARTON TRANSFER UNIT

CROSS-REFERENCE TO RELATED APPLICATIONS DATA

This application is a divisional application of U.S. patent application Ser. No. 10/763,893, filed Jan. 23, 2004.

BACKGROUND OF THE INVENTION

The present invention is directed to a carton transfer unit. More particularly, the present invention is directed to a carton or package transfer unit for use with a form, fill and seal packaging machine that receives partially erected cartons at one pitch, orientation and spacing, moves the cartons through a reorientation and respacing step for application of a process on the cartons and orients and spaces the cartons for further processing.

Consumers have come to recognize and appreciate resealable closures for containers to store, for example, liquid food products and the like. These resealable closures permit ready access to the product while providing the ability to reseal the container to prolong the life and freshness of the product and to prevent spills after initial opening of the container. Typically, the containers or cartons are formed from a composite of paperboard material having one or more polymer coatings or layers to establish a liquid impervious structure.

In known containers having such closures, the closures, which are formed in a separate process and transported to the packaging process, are conventionally affixed to the containers as part of the overall form, fill and seal operation. Typically, the closures are affixed to the partially erected carton prior to filling the carton with product. One known method for affixing the closure to the carton uses an ultrasonic welding process. In this process, the carton is partially erected and the closure is brought into contact with the carton, overlying an opening in the carton. Subsequently, an anvil is placed against the carton material and an ultrasonic horn is brought into contact with a flange of the closure. The ultrasonic horn is actuated which ultrasonically welds the flange to the carton material.

Another method for affixing closures to cartons uses an induction heating process. In this process, again, an anvil is placed on the carton material and an induction sealing head is brought into contact with the flange. A current is induced in the induction sealing head which, again, results in welding the flange to the carton.

Still another method applying closures to cartons is to directly mold the closure on the carton. Such a method is, for example, disclosed in Lees, et al., U.S. Pat. Nos. 6,467,238 and 6,536,187, which patents are commonly assigned with the present application and are incorporated herein by reference. The apparatus and method in the patents to Lees et al., include inserting a carton into a mold station, closing the mold tools on the carton, injecting a polymer into the mold cavity to form the closure, opening the mold tool and removing the carton (with the closure molded thereon) from the mold apparatus.

It has been found that direct molding the closures onto the cartons (as compared to applying/affixing the closures to the cartons) has a number of advantages. First, there is no longer a need for the equipment to store, transport and apply the closures to the cartons. Although the direct molding methods require equipment for carrying out the molding, there is less equipment needed for direct closure molding application. Moreover, and quite importantly, there is no longer a need for closure supply. Eliminating the reliance on the supply of closures is important for a number of reasons. First, there is always the possibility that the supply of closures is interrupted. This, of course, impacts the entire form, fill and seal operation in that operations must cease until closures are available for the cartons.

In addition, in that machine operations may vary based upon product demand, it is desirable to not have to maintain a large quantity of closures on hand (to, for example, satisfy high demand). Moreover, it is easier to maintain a quantity of “raw” polymer or plastic on hand to meet demand. In that the polymer is typically supplied and stored in pellet form, it requires less space and is more readily commercially available than preformed closures.

Nevertheless, there are many form, fill and seal machines presently in use that continue to use conventional closures. Moreover, many parts of these machine use a number of known, “standard” carton pitches and orientations. For example, machines are manufactured for filling cartons having standard 70 mm by 70 mm and 95 mm by 95 mm cross-sections. The cartons, however, are fed onto mandrels in the form, fill and seal machine in different pitches and orientations. Regardless, in order to reduce the costs for providing such direct molded closures, it is desirable to maintain one standardized orientation and format for such a molding apparatus.

Accordingly, there is a need for an apparatus that permits use of a standardized molding apparatus with various different form, fill and seal packaging machines. The resulting “common” parts provides considerable economic advantage. Desirably, such an apparatus can be “inserted” into any of a number of standard form, fill and seal machines with minimal changes required to the machine. Most desirably, such an apparatus is used without adversely impacting the overall form, fill and seal machine operation.

BRIEF SUMMARY OF THE INVENTION

A transfer unit is for use with a form, fill and seal packaging machine. The transfer unit is configured for receiving a partially erected carton from a carton magazine/erector in a tubular form and for conveying the carton in the tubular form to a molding station. A closure is molded onto the carton at the molding station. The transfer unit then receives the carton from the molding station and conveys the carton to an unload station to move the carton onto the packaging machine mandrels.

The transfer unit includes a hub that defines a longitudinal hub axis about which the hub rotates. A drive rotates the hub.

A plurality of rail-mounted car pairs are mounted to the hub for longitudinal movement along the hub generally parallel to and spaced from the hub axis. Each of the car pairs includes first and second cars. Each of the cars has first and second mandrels mounted thereto. The mandrels are configured to receive the partially erected carton. A present transfer unit includes four pairs of cars.

Each mandrel has a mandrel axis and is rotational about its respective axis. The mandrel axes are perpendicular and tangential to the hub axis. The transfer unit includes means for longitudinally moving the car pairs along the hub. In a present embodiment, each of the car pairs includes a car drive having a belt disposed about a pair of shafts. One of the cars is mounted to one side of the belt and the other car is mounted to the opposing side of the belt such that rotation of the belt effects movement of the cars toward one another or away from one another.

A present car drive includes one driven shaft and one idler shaft. The driven shaft is operably connectable to a drive receiver for rotating the shaft. A T-drive is mounted to the driven shaft and is received in the drive receiver for rotating the shaft. The drive receiver is operably connected to a motor.

Guide rings are disposed at a longitudinal end of the hub in which the T-drive traverses as the hub rotates. The rings have a fixed portion and a rotating portion (the rotating portion also being the drive receiver).

Each car includes a toggle for operably connecting the mandrels of each car with one another and to simultaneously rotate the operably connected mandrels about their respective axes. Stops are operably connected to the toggles to position the mandrels at the twisted and untwisted positions.

Interlock rods are operably connected to each car pair and cooperate with the guide rings. The rod and rings include notches and slots that align with one another to permit rotation of the hub when the cars are properly positioned and to misalign with one another to interfere with rotation of the hub when the cars are not properly positioned.

The hub rotates through four discrete stations or quadrants. At a first quadrant, the cars are at a first longitudinal position and cartons are loaded on to the first mandrels of the first and second cars. The first and second cars then move longitudinally and cartons are loaded on to the second mandrels of the first and second cars. The first and second cars move further longitudinally and the first and second mandrels of the first and second cars rotate about their respective axes.

At the second quadrant, the cartons are transferred into the molding station and subsequently transferred back to the transfer unit.

At the third quadrant, the cars essentially reverse for transferring the cartons from the transfer unit to the turret mandrels of the form, fill and seal machine. The cartons move longitudinally outwardly and the cartons are removed from the second mandrels of the first and second cars. The cars then move further longitudinally outwardly and the cartons are removed from the first mandrels of the first and second cars.

The fourth quadrant is a “dead” quadrant in that no operation on the cartons or on the hub is carried out. During rotation of the hub from the fourth quadrant to the first quadrant, the mandrels undergo an untwist to reposition the mandrels for receipt of the next set of cartons.

A transfer drive is also disclosed, as is an unloader. The unloader unloads the cartons from the transfer unit and loads the cartons onto the machine turret. The unloader includes a frame, a pair of rotating elements mounted to the frame and a drive operably connected to one of the pair of rotating elements. A belt is positioned around the rotating elements for rotation with the elements and a finger is operably connected to the belt for engaging the carton at the unload station and for moving the carton from the transfer unit to the turret mandrel.

In a present unloader, the finger reciprocates and the rotating elements are wheels. One of the wheels has different diameter than the other wheel.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
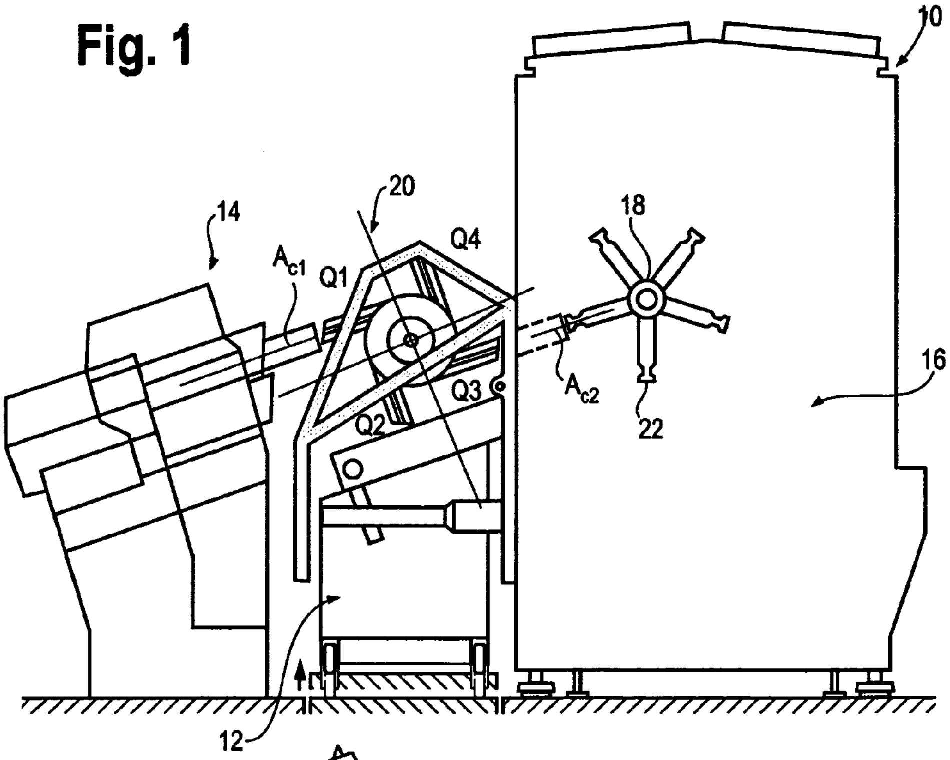
FIG. 1 is a side view of a form, fill and seal packaging machine and a carton magazine/erector with a closure forming device (molding unit) disposed between the magazine and the packaging machine and with a carton transfer unit embodying the principles of the present invention positioned above the molding unit.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures in particular to FIG. 1 there is shown an exemplary form, fill and seal packaging machine 10 having a molding unit 12 interposed between a carton magazine/erector 14 and a carton bottom sealing station 16 (machine turret 18). A transfer unit 20 embodying the principles of the present invention is positioned above the molding unit 12. Generally, the transfer unit 20 is configured to receive two cartons C from the carton magazine/erection station, laterally move the cartons and receive two additional cartons. The cartons are then further laterally inwardly moved and twisted. For purposes of the present disclosure, twisting refers to rotation of the carton about the carton longitudinal axis, whereas rotation refers to rotation of the transfer unit hub 24 about the hub longitudinal axis.

Following the second lateral movement and twisting, the transfer unit rotates the cartons into position for transfer into the molding unit, and following molding of the closure, receives the cartons back from the molding unit. The transfer unit then rotates and laterally moves the cartons. Two of the cartons are then unloaded from the transfer unit and are conveyed to the carton mandrels 22 on the machine turret 18, after which the remaining cartons are laterally moved and subsequently unloaded from the transfer unit 20 (and conveyed to the carton mandrels 22 on the machine turret 18). For purposes of the present disclosure (to prevent confusion) the mandrels 22 on the form, fill and seal machine turret 18 are referred to herein as turret mandrels 22).

The direct molding of a closure onto a carton is more fully described in Lees, et al. U.S. Pat. Nos. 6,536,187 and 6,467,238, which patents are commonly assigned with the present application and are incorporated herein by reference. An exemplary form, fill and seal machine can be such as that disclosed in Katsumata, U.S. Pat. No. 6,012,267, which patent is commonly assigned with the present application and is incorporated herein by reference.

As will be recognized by those skilled in the art, cartons are stored in a flat, folded form, with the side seal formed, in the magazine 14. In a conventional form, fill and seal packaging machine, the carton is picked from the magazine and erected or opened into a tubular carton form in the carton erector. The tubular form carton is then inserted onto a turret mandrel on the machine turret. As the turret rotates, the carton is moved through a series of stations at which the bottom flaps are heated, folded and sealed to form the sealed carton bottom wall. The carton is then "pulled" from the turret mandrel and positioned on a chain conveyor for movement through the machine to, for example, apply a closure, sterilize the carton, fill the carton with product and top seal the carton.

It was found that, using conventional form, fill and seal packaging machines, it was desirable to form the closure on the carton prior to forming the sealed bottom wall. As such, the closure molding station or unit 12 was best positioned between the carton magazine/erector station 14 and the carton bottom sealer 16. It was also found that it was desirable to be able to use a single molding unit 12 design (with accommodations for molding a plurality of closures at one time) regardless of the size of the cartons and the pitch/spacing/orientation of the cartons. The pitch or spacing of the cartons is determined by the spacing between the magazine 14 outlet chutes and the spacing between the turrets 18. The orientation is important in that a preformed opening in the carton C must be positioned such that that opening is properly positioned for molding the closure to the standard carton.

In addition, the form, fill and seal packaging machine 10 must receive the carton C in its normal orientation to preclude machine redesign and to achieve the overall objective of integration into existing machine 10 designs. However, in that the transfer unit 20 flips the cartons end-for-end, the one compensating factor is that the cartons C must be loaded upside down into the carton magazine 14. Loading the flat carton blanks upside down into the magazine 14 results in a 90 degree longitudinal twist upon erecting the cartons when compared to cartons loaded right side up. The transfer unit 20 compensates for this by its twist function as will be described below.

In order to accommodate a single molding unit 12 for use with a variety of form, fill and seal packaging machines, as set forth above, the transfer unit 20 is configured to receive two cartons (or a first pair of cartons) from the magazine/erector 14 at a first location and laterally shift the cartons to a second location so that a second pair of cartons can then be received on the unit. The four cartons are then laterally shifted and twisted to properly space and orient the cartons on their respective longitudinal axes. This set of cartons is then rotated (on the hub 24) about axis $A_{24}$ to position the cartons for receipt in the molding unit 12 (to position the opening in the carton for molding the closure). Following molding of the closures, the cartons are rotated (on the hub 24) about axis $A_{24}$ and shifted for unloading the first pair of cartons, then shifted again for unloading the second pair of cartons. The empty mandrels are then rotated about axis $A_{24}$ to an unused or dead position (the fourth quadrant $Q_4$, see FIGS. 1 and 11). During rotation of the hub 24 to the first or loading position, the carton mandrels 22 are "untwisted" to reset the twist orientation to properly position the mandrels for receiving cartons from the magazine.

The overall process includes loading two cartons at a time on an approximate one second cycle and molding four cartons at a time on an approximate two second cycle. This timing scheme provides the needed molding and cooling times while maintaining the overall form, fill and seal packaging machine throughput objectives.

Referring to FIGS. 11–16, there is shown the transfer unit 20. The unit 20 includes a central rotating hub 24. The hub 24 is divided into four identical sections that rotate through four quadrants $Q_1$–$Q_4$, at which specific steps are carried out, for purposes of structure as well as operation. The hub 24 is rotated about a longitudinal axis $A_{24}$ by a drive 26, such as the illustrated motor. In a preferred embodiment, a servomotor 26 is used to drive or rotate the hub 24. The servomotor 26 provides precise control over the movement, speed and positioning of the hub 24.

The hub 24 is divided into four identical sections, each including a pair of cars 28, each of which cars 28 includes a pair of mandrels 30 mounted thereto, for a total of four mandrels 30 per each of the four hub 24 sections. The cars 28 are mounted to the hub 24 along a rail 32 for lateral movement (i.e., movement parallel to the longitudinal axis $A_{24}$) along the hub 24. In a current embodiment, the cars 28 in each hub 24 section are mounted in a mirror image, symmetrical manner such that they travel toward the lateral center (indicated at 34) of the hub 24 (at which point they are next to one another) and away from the lateral center 34 of the hub 24 (i.e., toward the ends of the hub 24).

The mandrels 30 are supports for the cartons, and as such are configured for receiving and carrying the cartons from the magazine 14, through the molding unit 12 and to the carton bottom forming station 16. Each mandrel 30 is configured having a cruciform cross-sectional shape. Each pair of mandrels, e.g., 30*a* and 30*b* is mounted to its respective car 28 in fixed relation to one another, but so as to permit the mandrel 30 to rotate about an axis $A_{30}$ that is transverse to the car 28 and the movement of the car 28 along the hub 24. The cars 28 are mounted to the hub on the rail 32, which provides a track for movement of the cars 28 along the hub 24. For purposes of the present disclosure, rotation of the hub 24 about its axis $A_{24}$ is referred to as rotation and rotation of the mandrels 30 about their respective axes $A_{30}$ is referred to as twisting or untwisting.

Figure 4B:
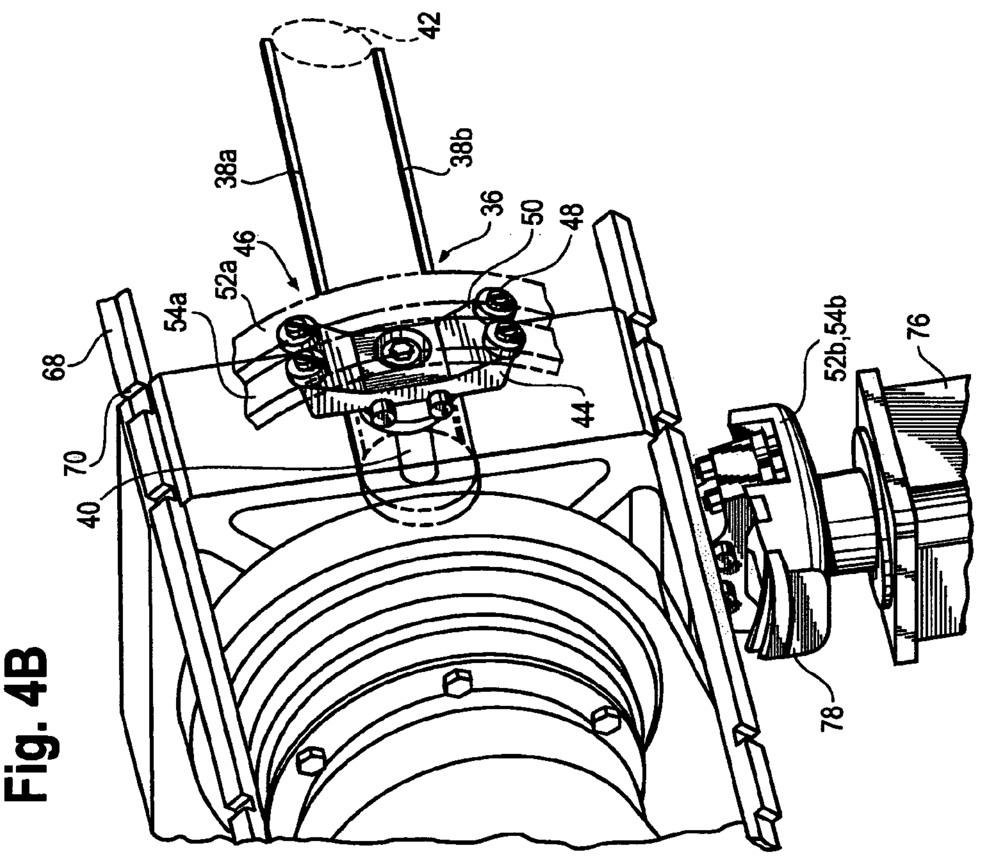
FIG. 4B is a partial perspective view having various parts of the machine removed for clarity, and as seen from a different angle than that of FIG. 4A, showing the car drive assembly and illustrating the T-drive for the car belts.
Figure 4A:
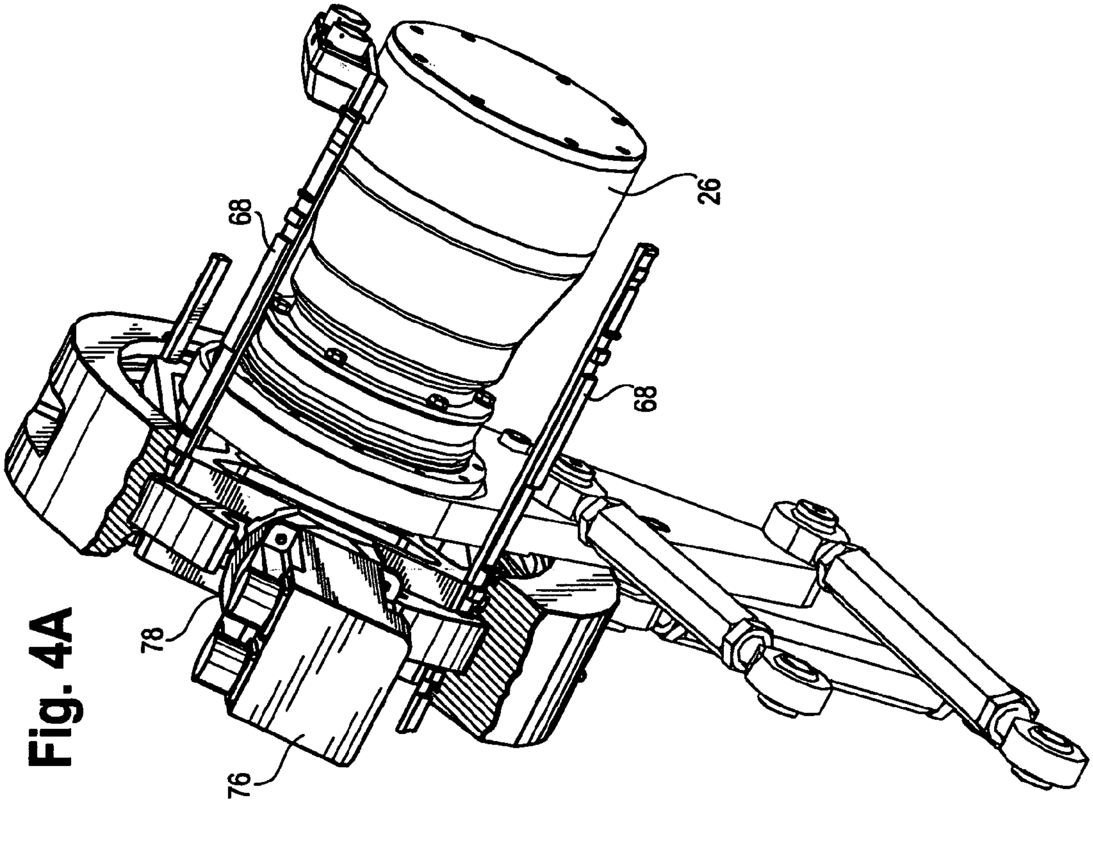
FIG. 4A is a perspective view, shown partially broken away, of the drive end of the hub and the car drives and interlock rods.
Figure 11:
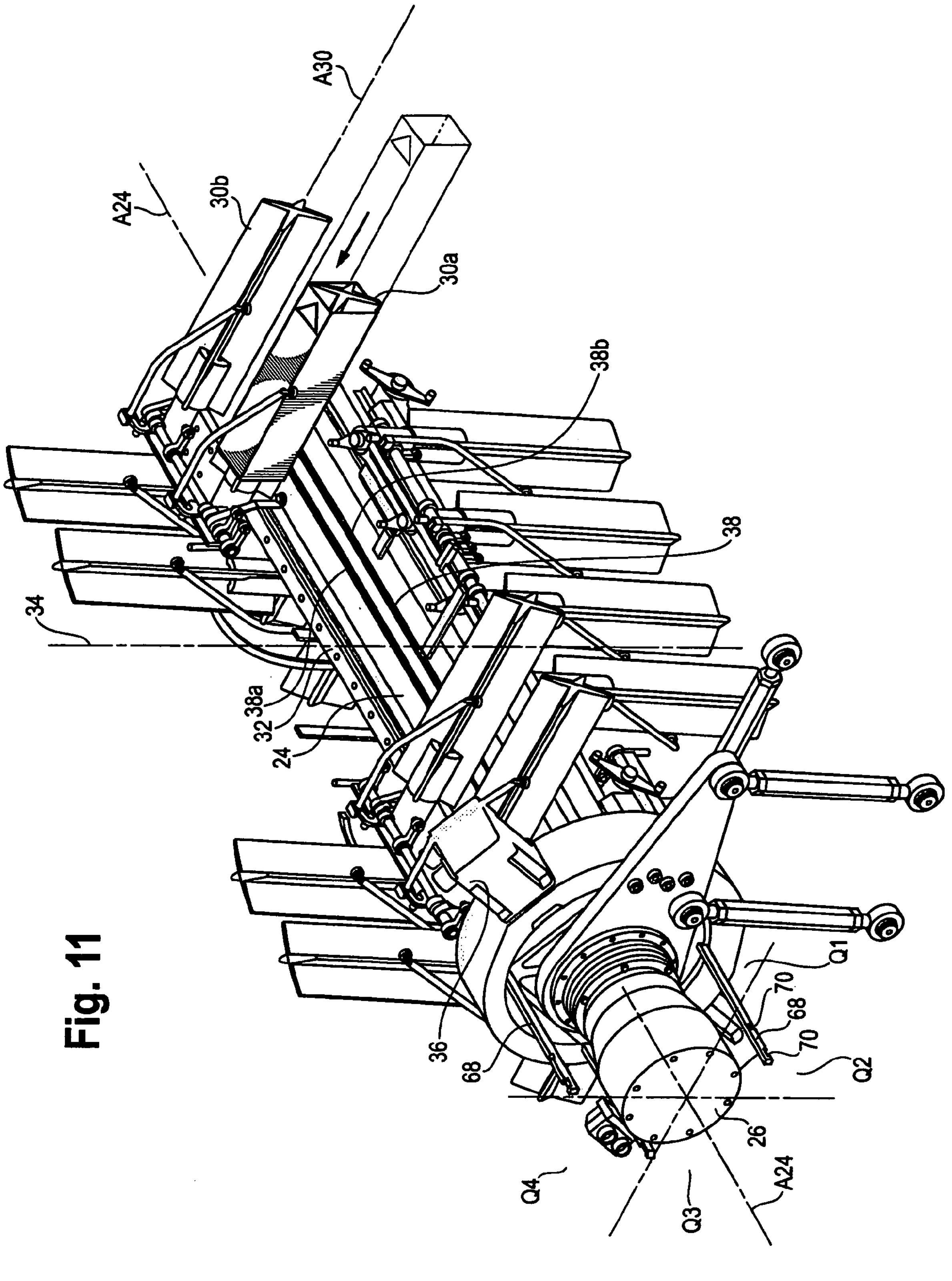
FIG. 11 is a perspective view of the transfer unit showing a carton being loaded onto a mandrel.

Referring to FIGS. 4A, 4B and 11, each hub 24 section includes a car drive or transport assembly 36. The transport assemblies 36 effect movement of the cars 28 assemblies 36 each include a rotating belt 38 disposed about spaced apart posts 40, 42. The posts 40, 42 rotate and are mounted to the hub 24 to permit free rotation of the belt 38. The cars 28 are affixed to opposing sides of the belt 38*a,b*. In this manner, as set forth above, rotation of the belt 38 in one direction effects travel of the cars 28 toward the lateral center 34 of the hub 24 (i.e., toward each other), and rotation in the opposite direction effects movement of the cars 28 away from the lateral center 34 of the hub 24 (i.e., toward the ends of the hub). One of the posts 42 is merely a rotational point for the belt 38, while the other post 40 includes a driving portion 44 for the belt 38. In a present embodiment, a T-drive 46 (having a T-shaped head portion) is mounted to the post 40 and is rotated to effect rotation of the belt 38. Rollers 48 are affixed to an upper surface 50 at each side of the of the T-drive 46. The rollers 48 are configured for running between a pair of guide rings 52, 54 (as will be discussed below), when the hub 24 is rotating.

The rings 52, 54 serve two functions. First, they provide a circular track in which the rollers 48 traverse as the hub 24 rotates. This track function is continuous throughout hub 24 rotation, including as the rollers 48 traverse into a car drive 36 (discussed in detail below). The second function of the guide rings 52, 54 is to provide a "crash protection" function. This function (also discussed in detail below) is provided by grooves or slots 92, formed in a portion of the rings (between the load and unload positions in quadrants $Q_1$ and $Q_3$) that are different from grooves or slots (not shown) formed in another portion of the rings (between the unload and load positions in quadrants $Q_3$ and $Q_1$). The grooves 92 cooperate with the interlock rod 68, as described below, to provide physical interference with rotation of the hub 24 in the event that the cars 28 are not in proper position for hub 24 rotation.

Figure 16A:
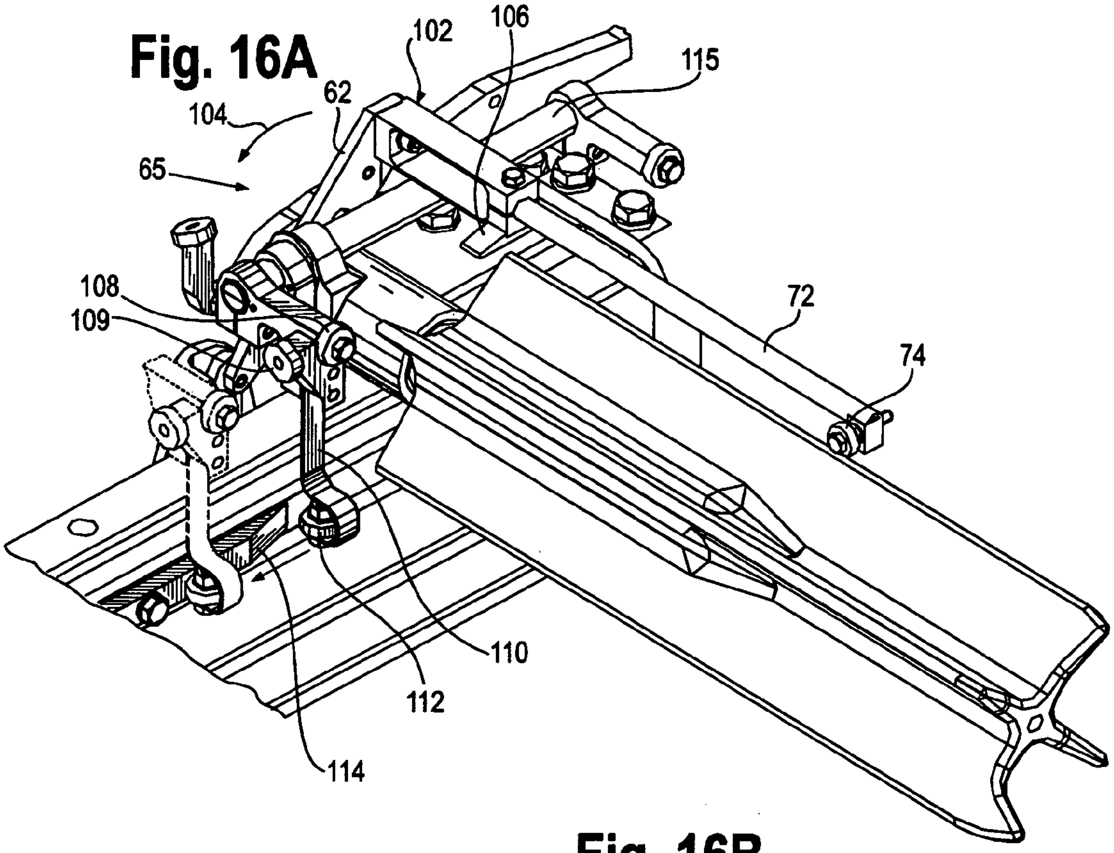
FIG. 16A is a partial perspective view of the car mounted to the hub rail and showing the retaining arm actuating assembly as the roller moves onto the ramp to slightly rotate the actuating assembly putting it in the locked configuration.
Figure 16B:
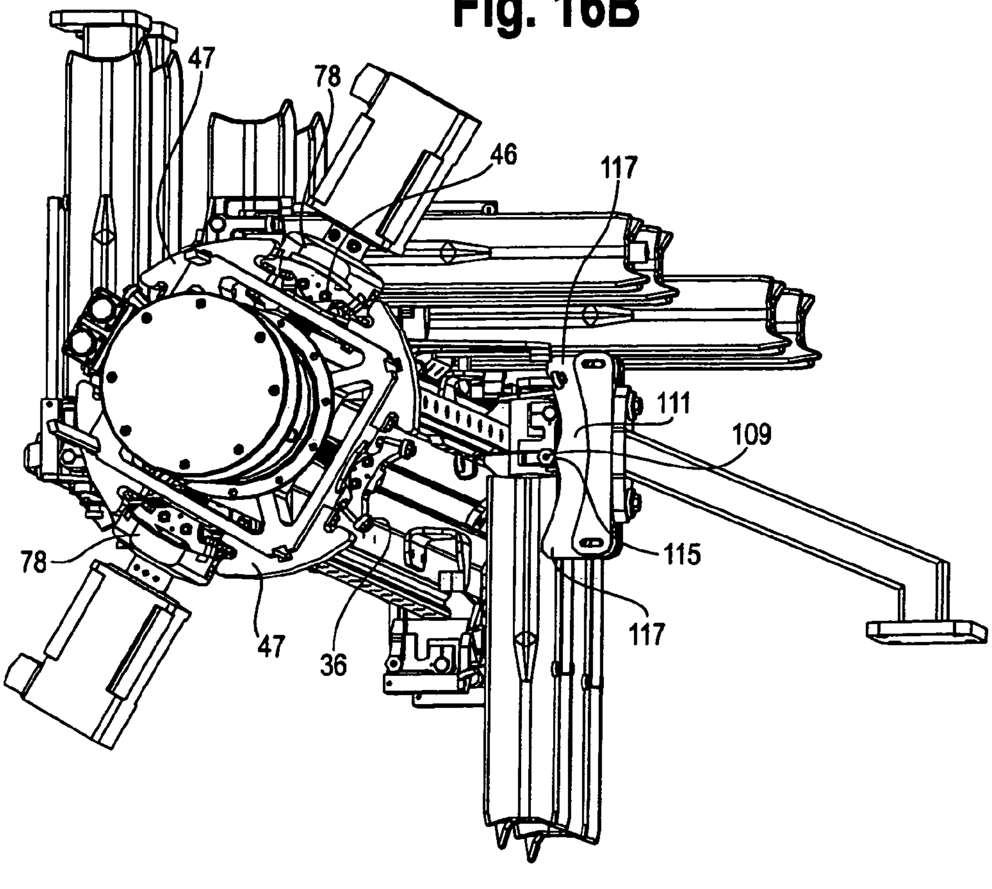
FIG. 16B is a perspective view of the hub, showing the T-drives and intermediate hub wings, and further showing the unlock cam acting on the cars to unlock the retaining arms for moving the cartons partially off of and onto the mandrels at the molding station.

Referring briefly to FIG. 16B, the car drives 36 (and specifically the four T-drives 46) are shown. Intermediate wing sections 47 extend between the T-drives 46 and are fixed, while the T-drives 46 rotate. The wings 47 serve as guides (running through the rings 52, 54, much like the T-drives 46) as the hub 24 rotates.

The mandrels 30 are mounted to their respective cars 28 by a spindle 56. The spindle 56 extends from a longitudinal end of the mandrel 30 into a sleeve 58 in the car 28. This arrangement permits rotation of the spindle 56 (and the mandrel 30) within the sleeve 58. An end 60 of the spindle 56 extends through and out of the end of the sleeve 58. A finger 62 is mounted to each spindle end 60 and a link element 64 extends between and is mounted to both fingers 62 to operably connect the mandrels 30. In this arrangement, rotational movement of one mandrel, e.g., 30*a* is imparted to the other mandrel 30*b* (as rotational movement) by the link 64 and fingers 62. Thus, the mandrels 30*a,b* rotate together and urging one mandrel 30*a* to rotate will result in the other mandrel 30*b* rotating as well. The fingers also include bumpers 96 (see FIG. 15A–15E) that contact a precisely adjustable stop 98. The bumper 96 on one car's finger 62*a* stops rotation in one direction and the bumper 96 on the other car's finger 62*b* stops rotation in the other direction. The link element 64 and a spring 100 are attached to bias the link 64 toward the car 28. The link 64, spring 100, bumpers 96, car spindles 56, and fingers 62 function together as a toggle 65. The toggle 65 requires actuation to twist or untwist the mandrels 30. Upon actuation, the toggle 65 retains its position until actuated in reverse, even though the actuation force is removed.

In addition, the toggle 65 relies on the stop 98 location (on the fingers 62) for precision, rather than relying on the actual toggle 65 movement. Once movement of the toggle 65 commences and the actuator has twisted the spindles 56 (mandrels 30) no more than about 60 degrees (or 90 degrees travel of the toggle 65), the biasing (spring 100) force pulls the link 64 in the proper direction and the stops 98 precisely position the link 64 (precisely finishing the 90 degree twist).

To facilitate rotation of the mandrels 30, turning vanes 66 are fixed to and extend from the hub 24. The turning vanes 66 are positioned along the line of movement of the cars 28 so that as the cars 28 pass the vanes, the respective fingers 62 contact the vanes 66 to rotate the mandrels 30. This occurs as the cars 28 move inward and the mandrels 30 are twisted (after carton loading). On the unload side, the cars 28 pull away from the vanes 66 as they move outward.

Figure 4C:
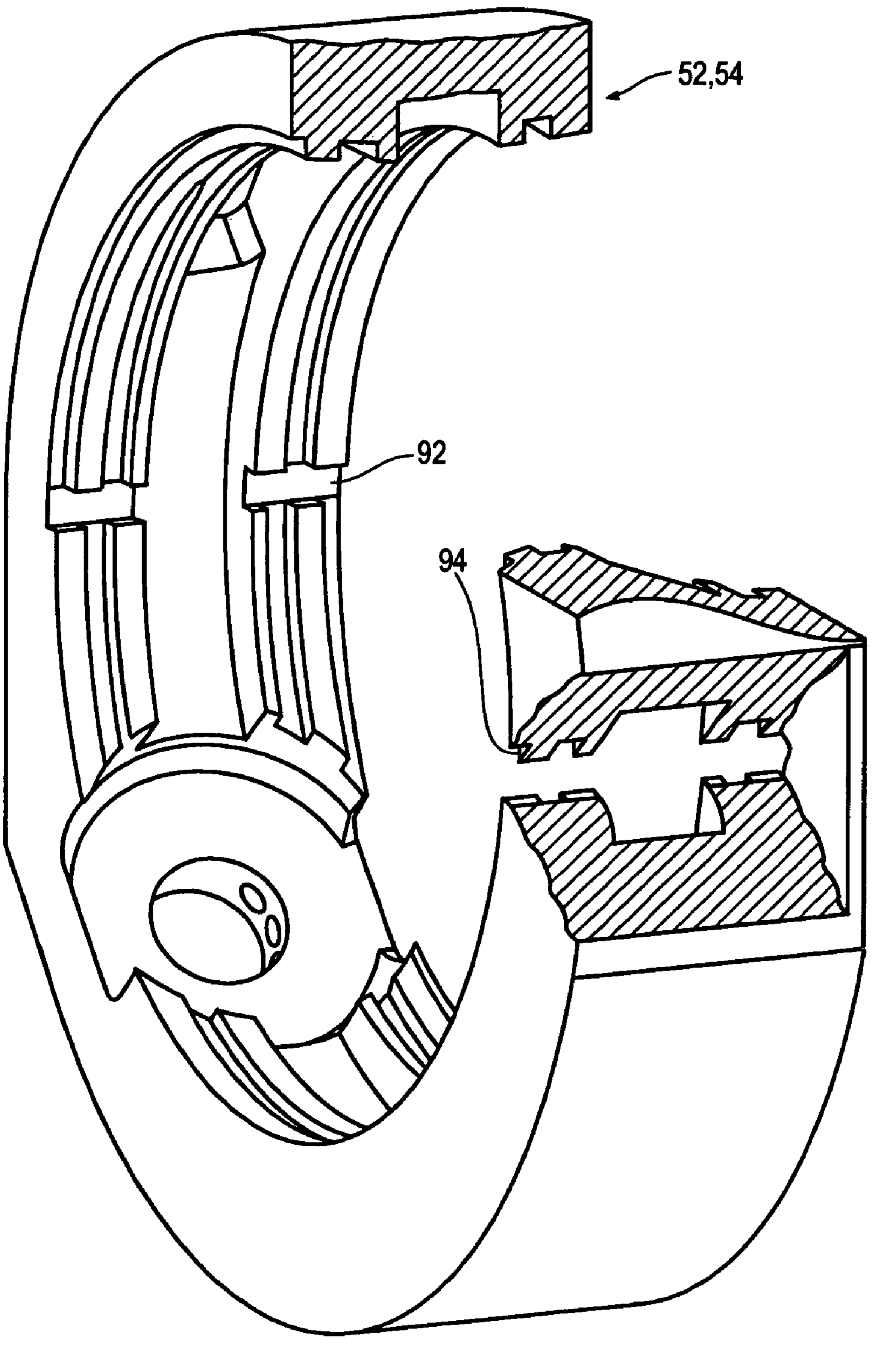
FIG. 4C is a partial perspective view of the guide rings illustrating the slots for accommodating the interlock rods.
Figure 5:
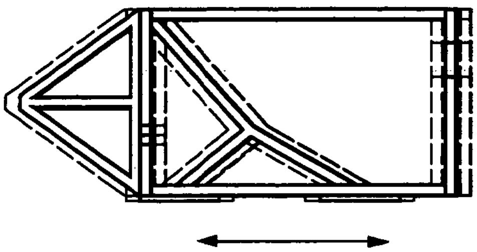
FIGS. 5 through 10 illustrate the degrees of movement of the frame for positioning the frame between the magazine/erector and the packaging machine so that the cartons are properly transferred into the packaging machine.
Figure 6:
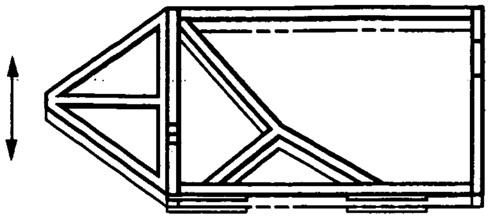
Figure 7:
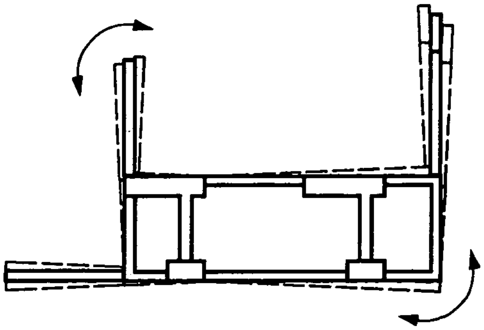
Figure 8:
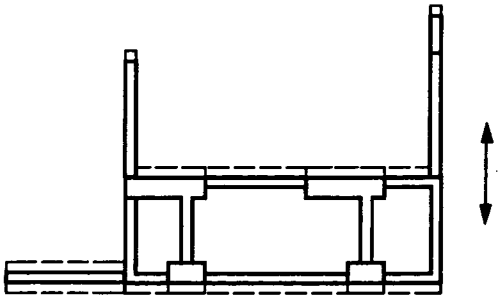
Figure 9:
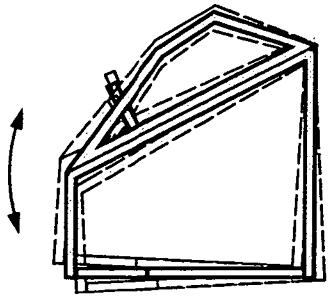
Figure 10:
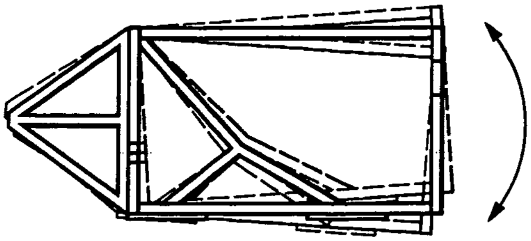

Referring to FIGS. 4A–4B and 11–14, each of the (four) cars 28 closest to the drive 26 includes the interlock rods 68. The rods 68 are mounted to the cars 28 and move laterally with the cars 28. The rods 68 include notches 70 formed therein that align with the guide rings 52, 54 on the transfer unit 20. The rings, as will be described below, are disposed at about the end of the hub 24 and partially encircle the hub end. The rings 52, 54 include a fixed part 52*a*, 54*a* and a rotating part 52*b*, 54*b*. The grooves or slots 92, 94 (see FIG. 4C) in the fixed portions of the rings 52*a*, 54*a* are configured to permit the rods 68 to move laterally passed the rings 52, 54 when the rods 68 are aligned with the slots 92, 94, when the cars are in the load and unload quadrants $Q_1$ and $Q_3$.

The rods 68 cooperate with the guide rings 52, 54 to assure that the (rotational position of the) hub 24 and the lateral or translational position of the cars 28 are in the proper position for the next move or operational step of the transfer unit 20. In the event that, for example, the cars 28 are not properly positioned for the next "move", the rods 68 and rings 52, 54 will contact each other, thus interfering with rotation of the hub 24 and an (drive 26) over-current signal will shut down the transfer unit 20 without damage to the unit. The rods 68 and rings 52, 54 also serve to assure that the hub axis $A_{24}$ and car positions are in the proper orientation and position following maintenance or service.

Figure 17:
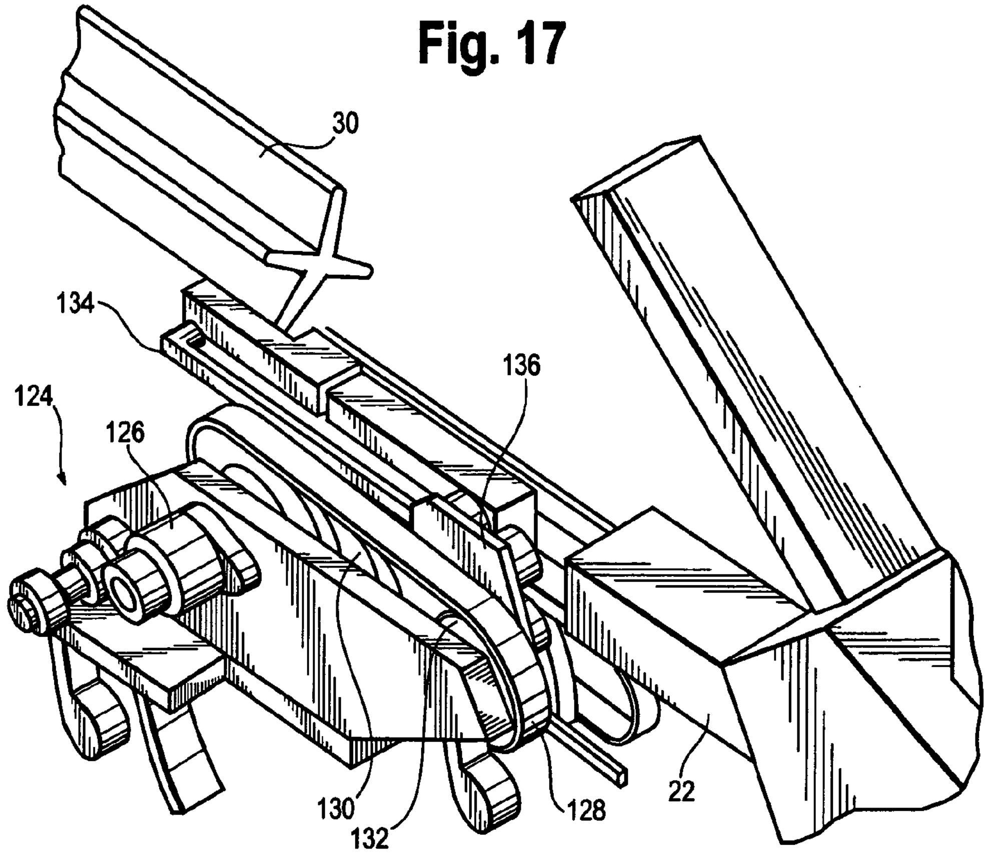
FIG. 17 is a perspective view of the puller finger for moving the carton from the transfer unit mandrel to the turret mandrel, the finger being in the transfer position.
Figure 18:
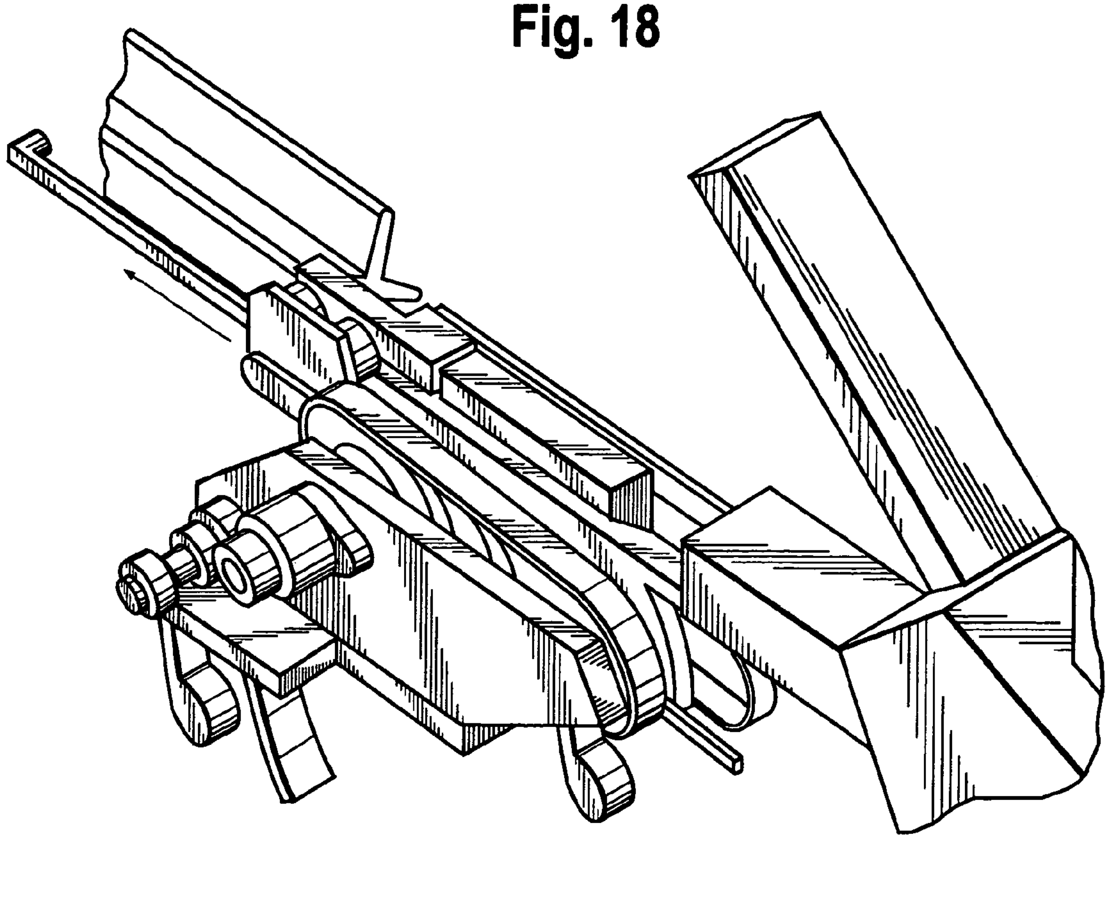
FIG. 18 is a perspective view of the finger being in the engaging position.

In addition, the rods 68 cooperate with an unloader 124, as seen in FIGS. 17–18 (for unloading the cartons from the transfer unit mandrels 30 to the turret mandrels 22) such that operation of the unloader 124 occurs only when the cars 28 are in the proper position for carrying out the unloading step.

A retaining arm 72 is associated with each mandrel 30. The retaining arms 72 are mounted to the cars 0.28 by flexures 102, fingers 62 and spindles 56 and extend toward an intermediate location on the mandrel 30 (intermediate the base of the mandrel 30, i.e., the mandrel spindle 56, and the end of the mandrel 30). The retaining arms 72 are configured to permit inserting a carton onto the mandrel 30 and to "hold" the carton on the mandrel 30, by application of a light force, as the hub 24 rotates. The retaining arm 72 is also configured to release the carton (by relieving the force) when the carton is to be moved onto or removed from the mandrel 30. A shoe 74 is positioned at the end of each of the retaining arms 72 to facilitate inserting the carton onto the mandrel 30, holding the carton on the mandrel 30 and removing the carton from the mandrel 30 with no damage to the carton material.

Referring to FIG. 16A, the flexure 102 connection is provided between the retaining arm 72 and the finger 62. The flexure 102 provides the flexibility needed (as when the arm 72 is actuated during hub 24 rotation, e.g., higher retention forces) as well as the spring load required to tension the arm 72 to the carton (during twisting, lateral movement loading and unloading, e.g., lower retention forces). The flexure 102 (and arm 72) is shown in the unlocked position. During operation, the toggle 65 is actuated (as indicated by the arrow at 104). In this position, the ramp 106 on the flexure 102 contacts roller 108 (which is connected to link arm 110 and roller 112 mounted to the end of the link arm 110). As the car 28 moves inwardly, the roller 112 rides up elevated element 114 on the hub 24. This urges the roller 108 on to the ramp 106. This "flexes" the flexure 102 which moves the retaining arm 72 toward the mandrel 30, thus tightening onto or holding the carton (or moving the arm 72 to the locked position).

As set forth above, the cars 28 move laterally along the hub 24. To provide the driving force for moving the cars 28, the car drives 36 include motors 76 that are disposed at about the guide rings 52, 54, between circumferential gaps in the fixed ring potions 52*a*, 54*a*. The rings 52, 54 continue and the rotating portions 52*b*, 54*b*, form the drive receivers 78. The drive motors 76 and ring portions 52, 54 (including the rotating ring portions 52*b*, 54*b*) are fixed on the transfer unit 20 whereas the hub 24 (and its related cars 28, mandrels 30 and T-drives 46) rotate relative to the rings 52, 54 and drive motors 76.

The receivers 78 (two receivers 78 total as seen in FIG. 16, which are also the rotating portions of the rings 52*b*, 54*b*) are each adapted, by virtue of the continuation of the rings' track-like function, to accommodate the T-drives 46 (of which there are four total, one each associated with the four sets of cars 28, and which are operably connected to the belts 38). In this manner, as the hub 24 rotates, the T-drives 46 move from the fixed ring portions 52*a*, 54*a* into the car drive receivers 78 (or guide ring rotating portions 52*b*, 54*b*). The hub 24 then stops, with the T-drives 46 in their respective receivers 78 and, when the drive motors 76 actuate, the T-drives 46 rotate which in turn drives the belts 38 to move the cars 28. A preferred drive motor 76 is a precision controlled motor, such as a servomotor, to provide maximum control of car 28 movement and position. As will be described below, during operation, the cars 28 require lateral movement when in only two of the four quadrants $Q_1$ and $Q_3$. As such, there are only two car drive motors 76 (located 180 degrees apart) on the transfer unit 20 because laterally driven movement is not required at the other two quadrants $Q_2$ and $Q_4$.

Referring now to FIGS. 19–23, there are shown operational "maps" of the transfer unit 20 with various carton cross-sectional sizes, i.e., exemplary 70 mm by 70 mm (FIGS. 19–21) and 95 mm by 95 mm cartons (FIGS. 22–23), as well as car designs for carton shifting. It should be noted that the transfer unit and car design disclosed above is that represented by the map of FIG. 21. To this end, reference will first be made to that map.

Figure 12:
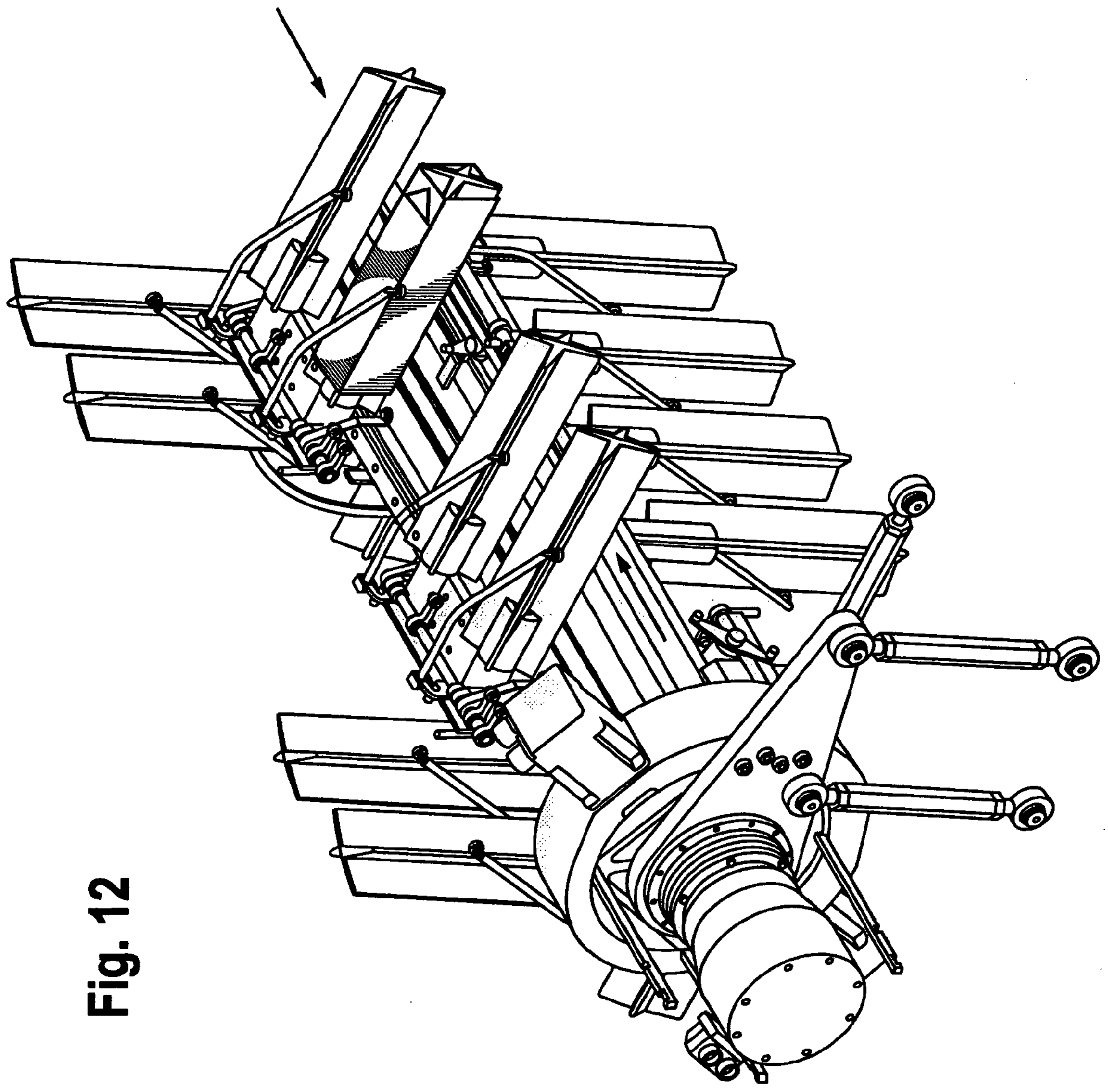
FIG. 12 is a perspective view of the transfer unit showing one (of four) carton loaded onto the mandrel and the cars moving laterally inward.
Figure 13:
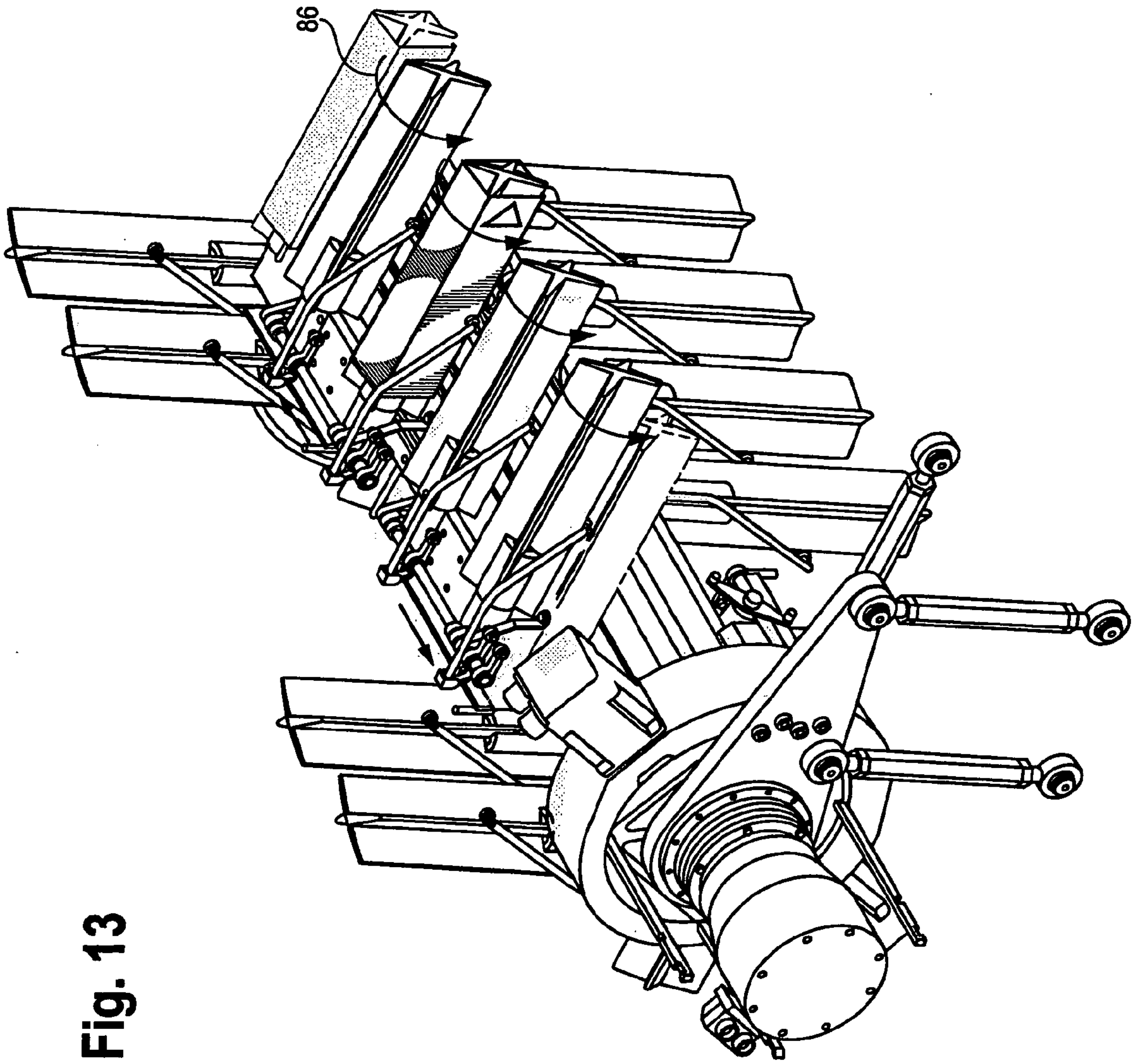
FIG. 13 is a perspective view showing the car moving further inward and further showing the twist of the mandrels.
Figure 14:
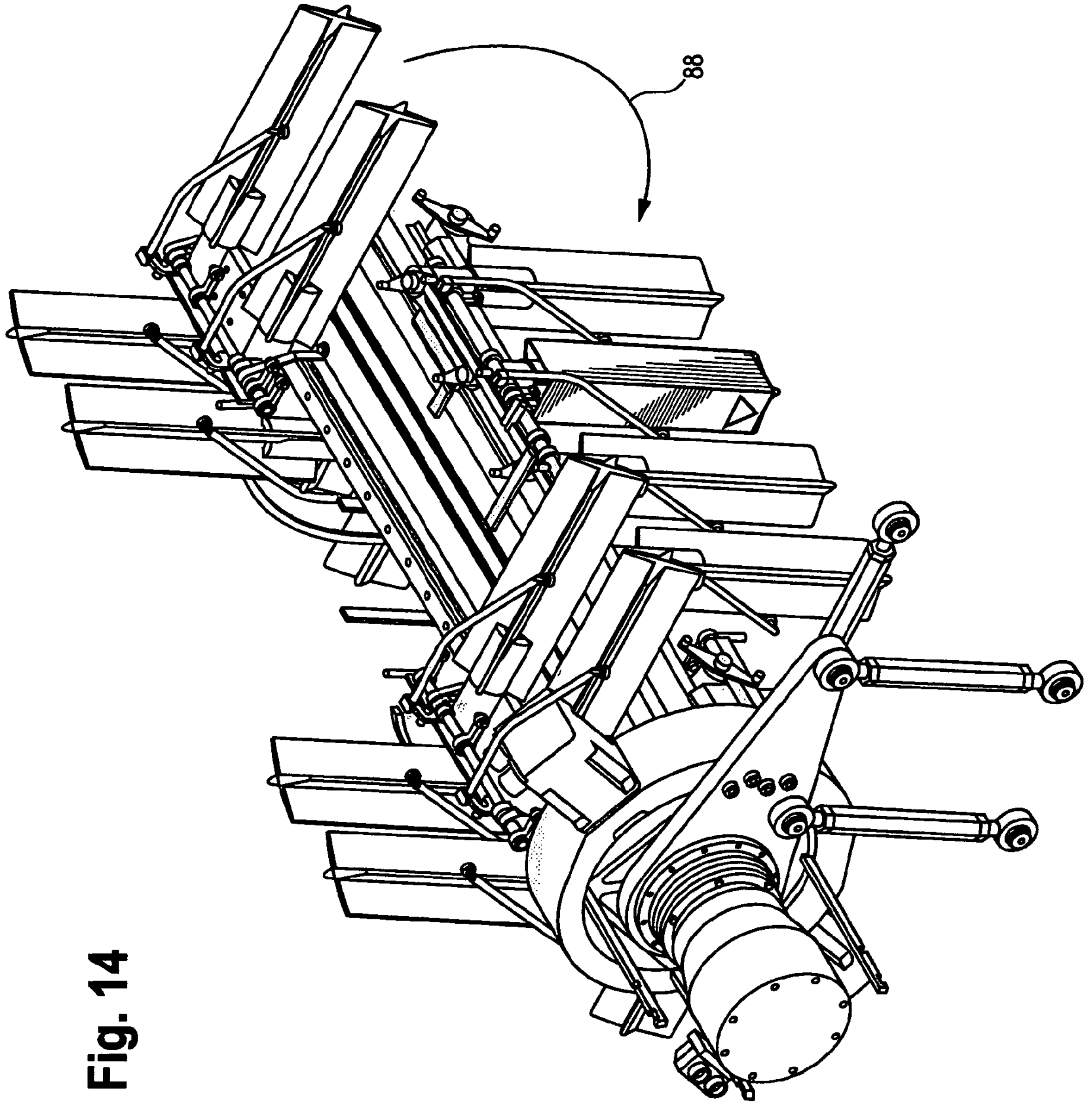
FIG. 14 shows the rotation of the hub to position the cartons at the molding unit.
Figure 21:
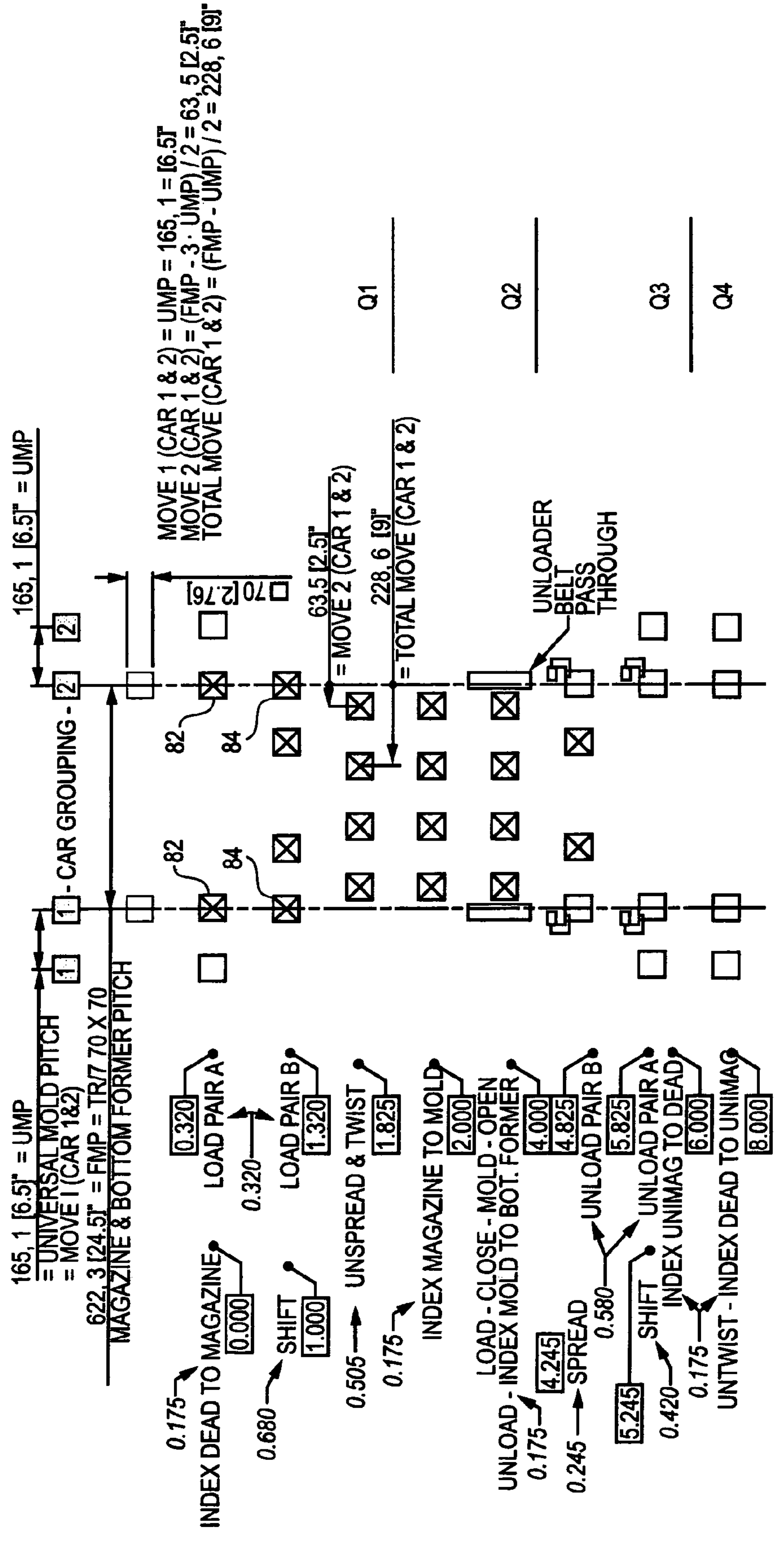
FIG. 21 is an operational map of the embodiment of the transfer unit discussed herein and that is configured for 70 mm by 70 mm cartons and has mirror image, symmetrically moving cars.

For purposes of operational description, the following is in reference to the operational map of FIG. 21 and the embodiment of the transfer unit 20 shown in FIGS. 11–13. Also for purposes of operational description, the movement of one row or pair of cars 28 through an operational cycle (through quadrants $Q_1$–$Q_4$) will be described. As illustrated, the hub 24 is in a first position in which the cars 28 are in quadrant $Q_1$ and are in a spread position. In this position, cartons C are loaded onto the inner mandrels 30*a* of each car (as shown by the "X" in box 82 in FIG. 21). The car drive 76 then actuates to move the cars 28 inward to position the outer mandrels 30*b* in alignment with the carton magazine/loader 14 (FIG. 12). Following loading of the second/outer cartons (shown by the "X" in box 84), the cars 28 move inward again, at which time the mandrels 30 twist (as indicated by the arrow at 86) to position the carton opening in the proper longitudinal axis orientation for molding. This inward movement positions the cartons at the proper lateral location or position (pitch) for transfer into the molding unit 12 once it has been rotated. This also aligns the notches in the interlock rods with the interlock rings, thus allowing the hub 24 to rotate about its axis $A_{24}$ and further actuates the carton retaining arms 72 by movement of roller 108 onto flexure ramp 106.

As discussed above, the "pitch" or distance between carton centers is the same for each of the carton sizes and for each of the form, fill and seal machine configurations. In this manner, a single molding unit 12 design can be used to accommodate a variety of filling machines. Twisting of the mandrels 30 and subsequent rotation of the hub 24 as indicated by the arrow at 88 in FIG. 14, positions the opening in the carton at the mold.

As can be seen in FIGS. 11–13, when the cars 28 are in the outer or in the mid positions (those positions for loading the inner and outer cartons, respectively, FIGS. 11 and 12), the interlock rods 68 extend beyond the guide rings 52, 54 such that the notches 70 in the rods 68 are out of alignment with rings 52, 54. In this manner, in the event that the hub 24 rotates, the current drawn by the hub drive 26 would be higher than anticipated, and power to the transfer unit 20 would be cut-off to prevent damage to the unit 20. Referring briefly to FIG. 16B, an additional "safety" is present in that the T-drives 46 must be present in the receivers 78 for the car drives 36 to actuate. In the event that the hub 24 is improperly positioned and the rigid wing sections 47 are positioned in the receivers 78, the resistance to rotation of the motors 76 provided by the wings 47 will result in an over-current signal that will shut down the transfer unit 20 without damage to the unit.

Figure 2:
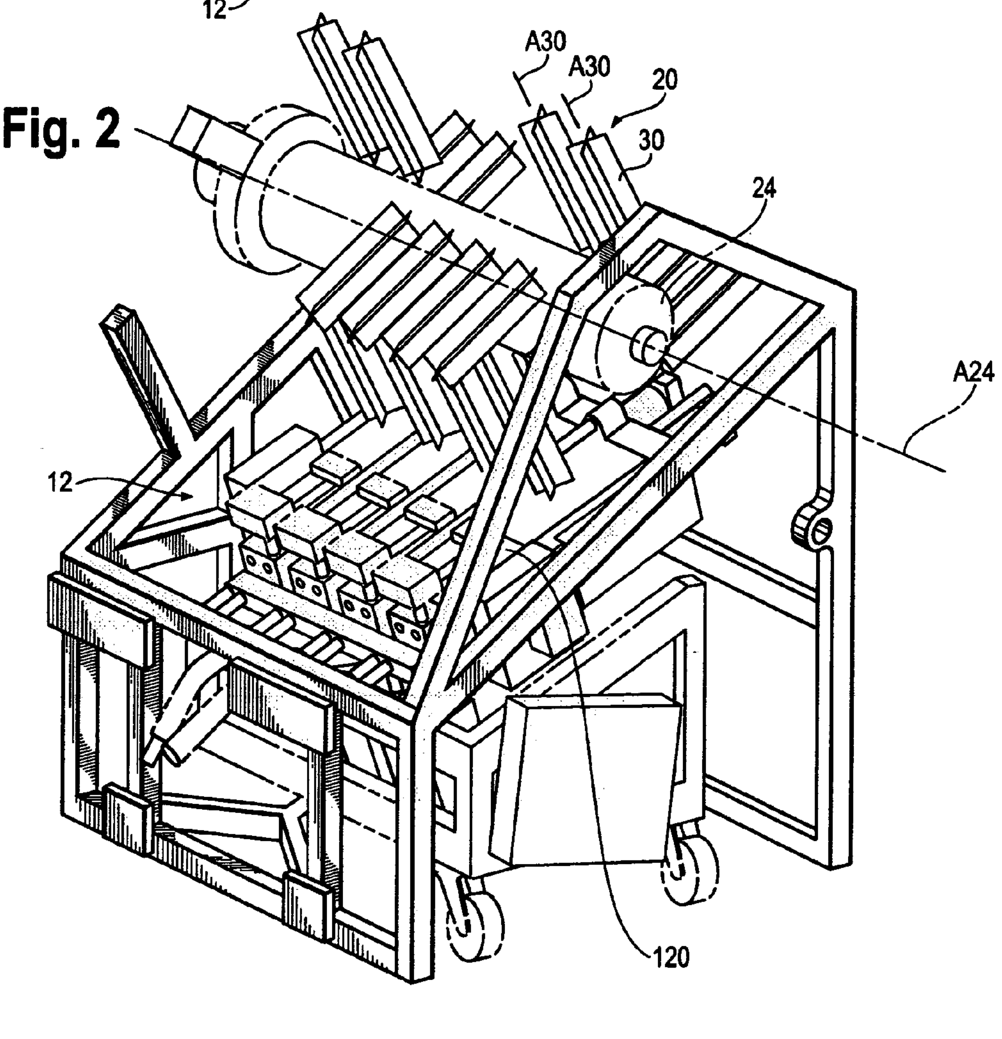
FIG. 2 is a perspective view of the transfer unit positioned within a frame that supports the transfer (and molding) unit and that is positioned between the magazine and the packaging machine.
Figure 3:
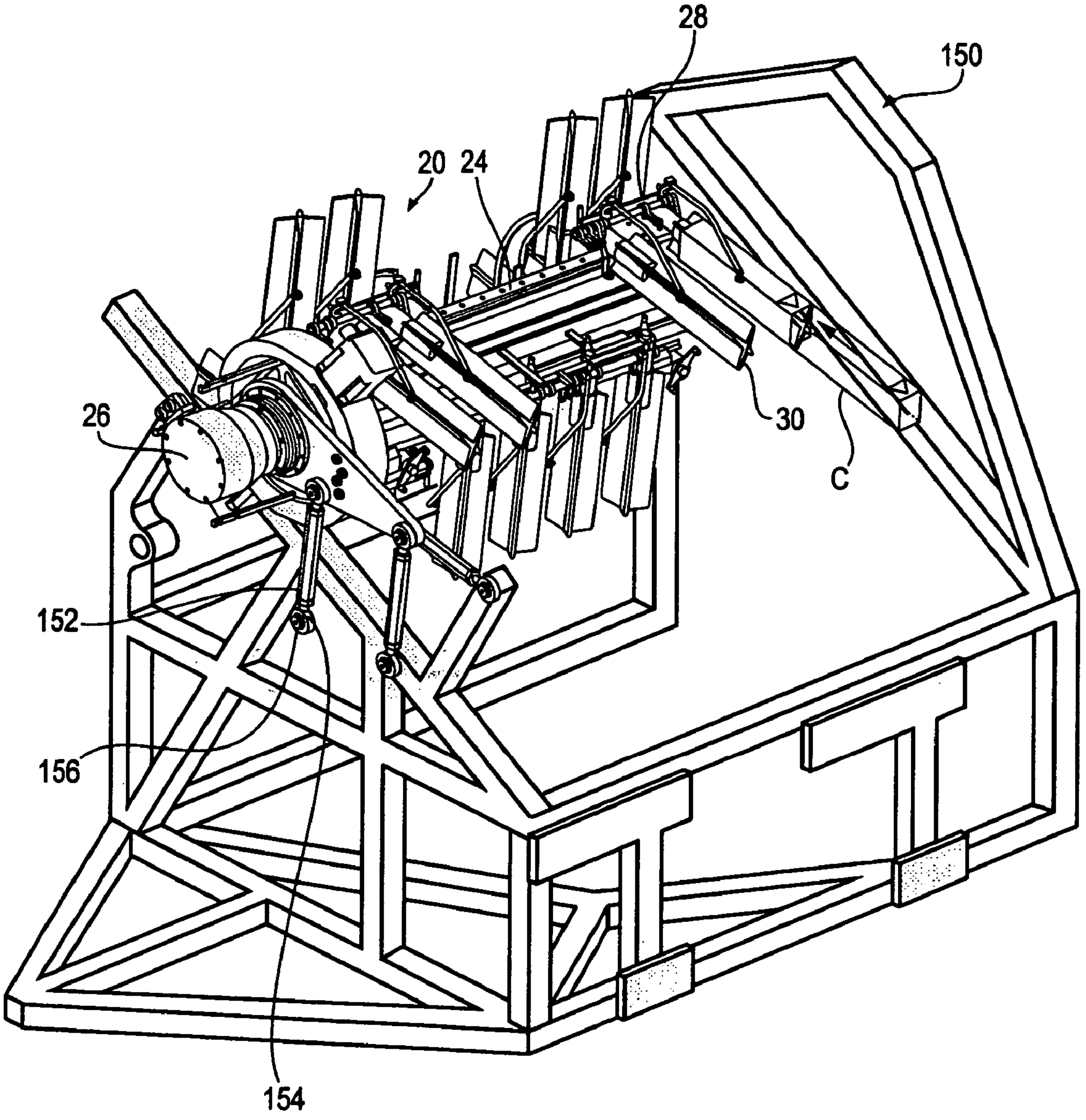
FIG. 3 is a perspective view of the transfer unit as supported by the frame in a six-degree of freedom (three translation and three rotational) mount.

Before the cartons are rotated to the universal mold position (in quadrant $Q_2$, see FIG. 13), the interlock rods 68 are aligned with the rings 52, 54 to permit hub 24 rotation. In this manner, the hub 24 positions the cartons at the molding unit 12. In order to move the cartons into the molding unit 12, the cartons must be released or unlocked from the mandrels 30. Referring to FIG. 16B, in the final (about) 5 degrees of hub 24 rotation, the retaining arms 72 are released by engagement of roller 109 (also seen in FIG. 16A) with cam plate 111. Hub 24 rotation is in the direction indicated by arrow 88. As the roller 109 runs up onto the cam plate 11 (specifically, as it traverse along the plate 111 and onto the lobe 115), the mount 113 (onto which rollers 108 and 109 are mounted), is rotated slightly clockwise about shaft 115. This tends to move roller 108 down along ramp 106 to allow the arm to move slightly away from the mandrel 30 to unlock the carton. As can be seen in FIG. 16B, as this occurs, arm 110 is "flexed" to allow this movement. The cartons are moved into the molds 120 (best seen in FIGS. 1 and 2), the molds 120 close on the cartons, and closures are molded to the cartons. The molds 120 then open and the cartons are transferred back to the transfer unit 20. It will be noted that the cartons C are not fully moved off of the mandrels 30 when they are "moved" into the molding unit 12; rather, the cartons C are partially moved off of the mandrels 30 and into the molding unit, with a portion of the cartons C remaining on the mandrels 30 during the molding operation.

Following completion of the molding step, the hub 24 rotates to the third position in which the cars 28 are in quadrant $Q_3$. During the first (about) 5 degrees of hub 24 rotation, the retaining arms 72 are "relocked" by virtue of the continued rotation of the hub 24 (that is, after the closures have been molded on the cartons and the cartons reloaded onto the mandrels 30). The continued rotation of the hub 24 moves roller 109 off of the lobe 115 on cam plate 111. This relaxes arm 110, which (slightly) rotates shaft 115 to allow roller 108 to move back up ramp 106, thus relocking the arm 72 on the carton. The cam plates 111 have arcuate entrance and exit "ramps" 117 to ease the transition of the arm 72 from locked to unlocked.

In quadrant $Q_3$, the mandrels 30 (and cartons) go through an unload scenario beginning with an outward shift. This outward shift unlocks the carton retention (by movement of the roller 112 off of element 114). Following this shift, the outer cartons are removed from the mandrels 30, and the cars 28 shift again for removing the inner cartons from the mandrels 30. As will be appreciated by those skilled in the art, when the cartons are removed at the third position, this position is 180 degrees from the position that the cartons are placed on the transfer unit 20. Thus, the cartons are essentially in-line for removal and for positioning onto the carton turret mandrels 22 for further processing (e.g., carton bottom wall forming).

There is, however, an important dog-leg offset effect as can be seen in FIG. 1 (that is $A_{C1}$ is at a higher elevation than $A_{C2}$). This compensates for the gain in elevation that would otherwise occur due to the upward slope of the carton path across the transfer unit 20. This provides an operator interface, at the magazine 14, that is at about the same elevation (height) with or without the transfer unit 20 in place.

As can be seen from FIG. 21, the cars 28 and mandrels 30 are returned to their initial outward position laterally along hub 24 while at the third position $Q_3$. The arrival at the outward position causes the notches in the interlock rod 68 to align with the rings 52, 54 allowing the next hub 24 rotation to occur. The hub 24 then rotates to the fourth or final quadrant $Q_4$ (position) which is a "dead" position in that the cars 28 do not laterally move and there are no cartons on the mandrels 30 that undergo processing, the cartons having been removed when the hub 24 was at the third position.

Figure 15A:
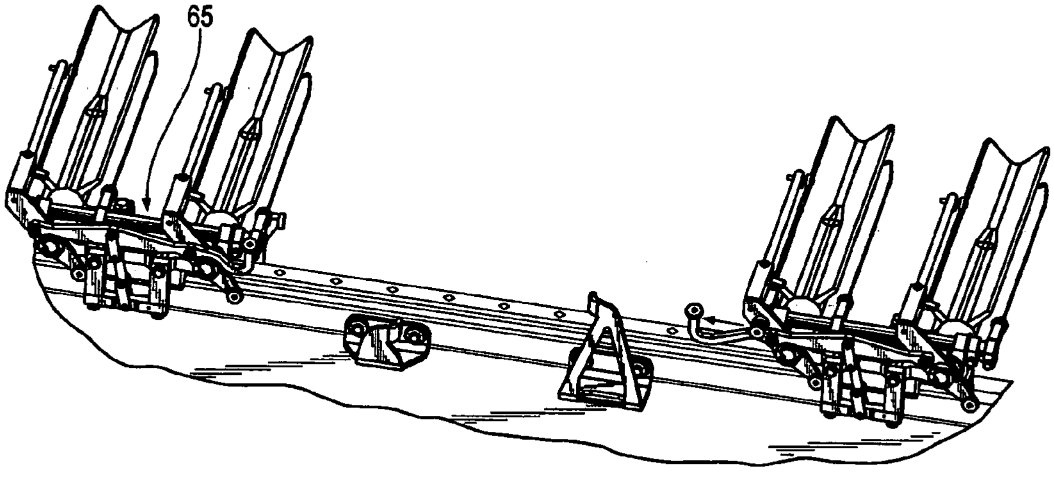
FIGS. 15A–15F are rear views of the cars and mandrels during a cycle of the transfer unit, showing the mounting of the mandrels to the cars and the links for rotating the mandrels during car lateral movement, FIG. 15A illustrating the cars in a spread position with the mandrels untwisted for loading cartons onto the first or inner mandrels, FIG. 15B showing the cars as they move laterally inward for loading cartons onto the second or outer mandrels, FIG. 15C showing the cars in the innermost position and the mandrels having just completed a twist, FIG. 15D showing the outward movement of the cars for unloading, FIG. 15E showing the cars fully unloaded and in the spread position after the hub has rotated and the mandrels have been untwisted in preparation for reloading, and 15F showing the untwist rollers and cam just prior to the untwist action (that is, still in the “twisted” orientation)
Figure 15B:
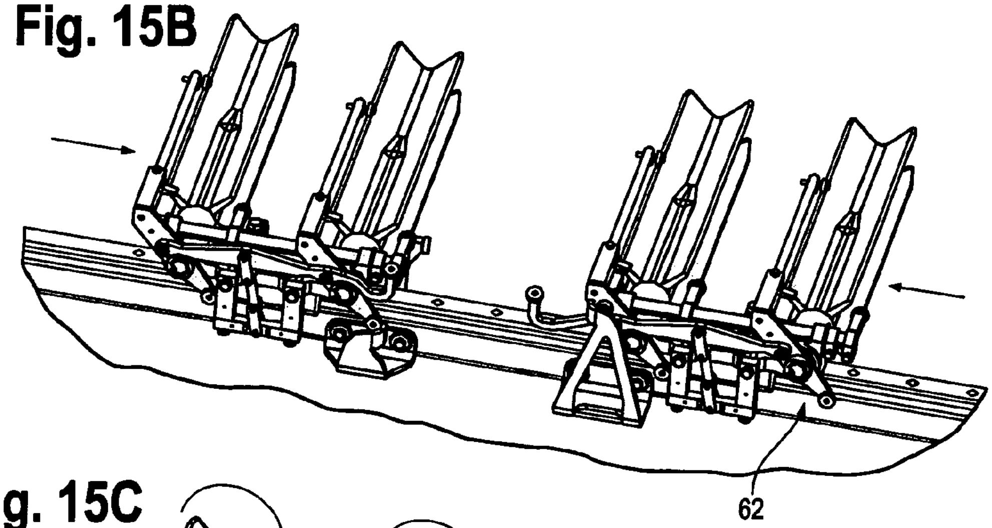
Figure 15C:
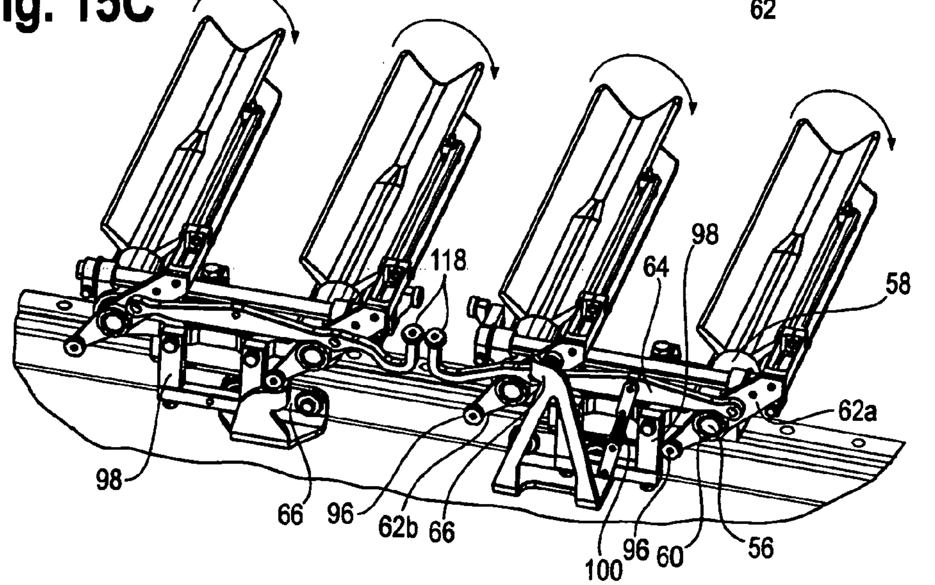
Figure 15D:
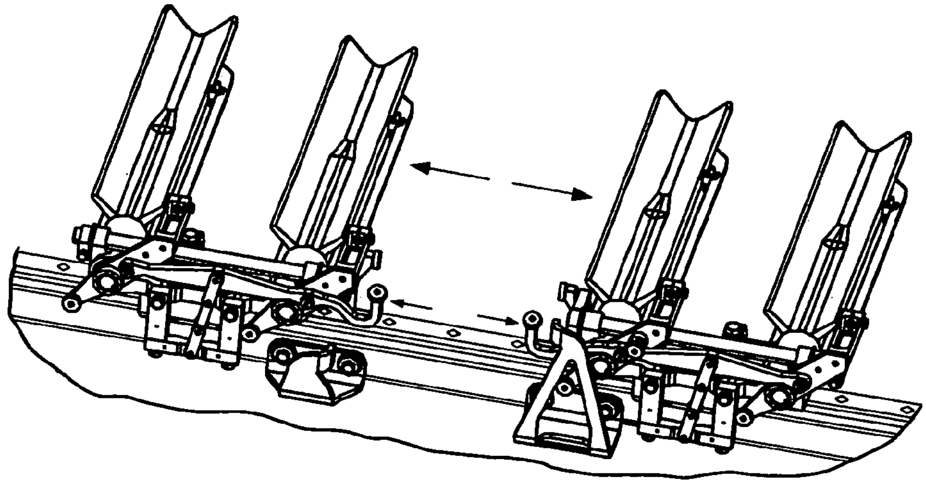
Figure 15E:
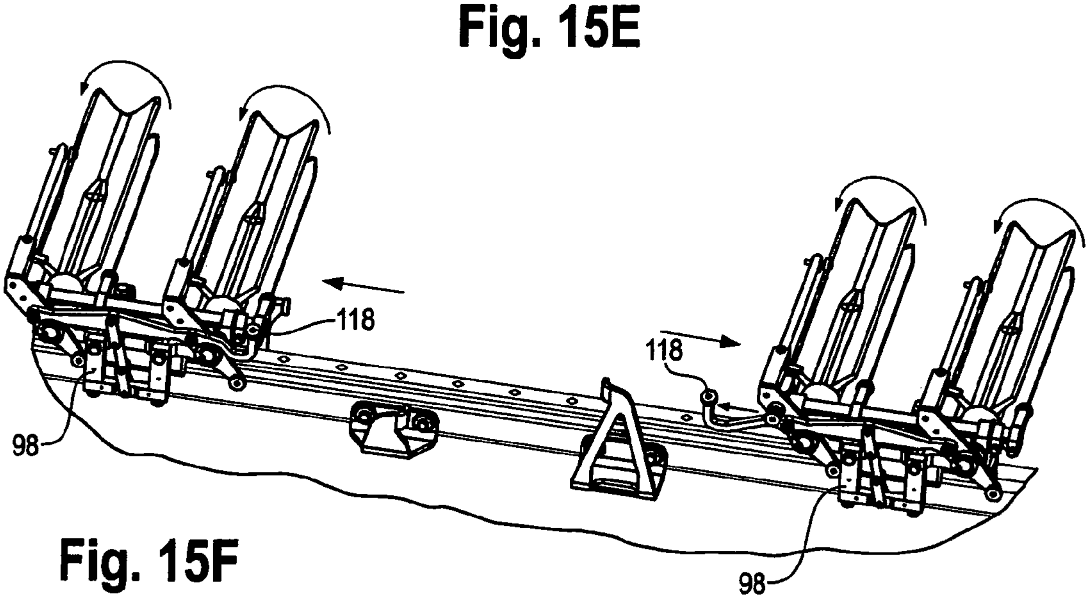
Figure 15F:
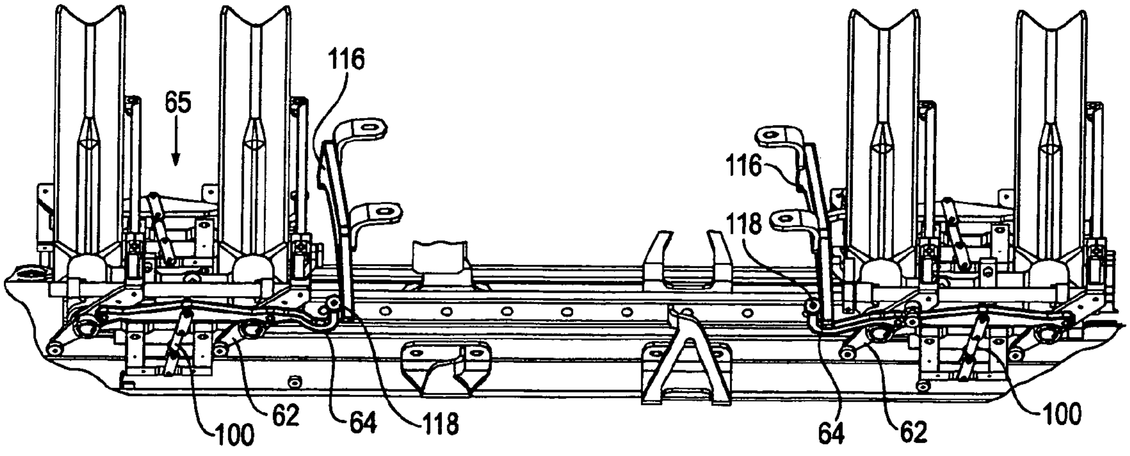

There is also an untwist that occurs between quadrant $Q_4$, the "dead" quadrant and quadrant $Q_1$, the loading quadrant, that untwists the mandrels 30 (to reset the twist in $Q_1$ that occurs immediately following loading). The untwist is effected by untwist cams 116 mounted on the frame that engage the cam followers 118 on the end of the link 64 (see FIGS. 15E and 15F, in which FIG. 15E illustrates the mandrels 30 having undergone the untwist, and FIG. 15F illustrates the engagement of the cam followers 118 on the cams 116). It should be noted that in the present embodiment, the links 64 are slightly different (right-hand to left-hand) in the that the cam followers act on the same sides of the cams 116, rather than in mirror image to one another. During the rotation from $Q_4$ to $Q_1$, the untwist cams 116 cause the link 64, fingers 62, spring 100 and spindles 56 to toggle back to their initial position. The adjustable stops 98 provide the precision positioning necessary to assure proper mandrel 30 longitudinal axis $A_{30}$ positioning for receiving cartons.

As noted above and as will be appreciated by those skilled in the art, the transfer unit 20 is supported by the frame 150 over the molding unit 12 and between the magazine/erector 14 and the form, fill and seal machine 10. As will also be appreciated, it is imperative that the cartons be properly and precisely positioned in the molding unit 12 and properly and precisely positioned on the turret mandrels 22, otherwise damage to the cartons may occur. To this end, it is important that the "link" between the magazine/erector 14 and the turret mandrels 22, that is, the transfer unit 20, be properly and precisely positioned to effect the transfer. The importance of precision is magnified in that the rate of transfer of cartons through the transfer unit 20 is quite high.

To this end, the transfer unit 20 is mounted on the drive end to the frame 150 by a plurality of struts 152 having turnbuckles 154 that permit precise and fine adjustment of the position of the transfer unit 20 between the erector/magazine 14 and the form, fill and seal machine 10. The turnbuckle portions 154 include mounting eyes 156 by which the unit 20 is fastened to the struts 152. On the idle end, the hub is held by a spherical bearing. The bearing mount is adjusted up-and-down and side-to-side by jacking screws. An adjustable stop nut positions the hub against the bearing. A cap on the outside of the bearing is used to lock the bearing along the length of the hub as determined by the adjustable stop nut. Such an arrangement permits removing the transfer unit 20 to, for example, carry out maintenance and to reinstall the unit 20 in precisely the same place, without readjusting the unit 20. In addition, such an arrangement reduces the opportunity for binding and damage due to improper adjustment, that is, any of the adjustments can be made independently of the other adjustments without loosening the other adjustable elements.

One of the benefits of this type of supporting arrangement is that because the "precision" in positioning is provided by the adjustment of the turnbuckles, the frame itself requires a lower level of precision in assembly or construction. This results in lower frame fabrication costs (no post welding machining or the like), with no repeatability penalty at the adjusted assembly level.

Figure 19:
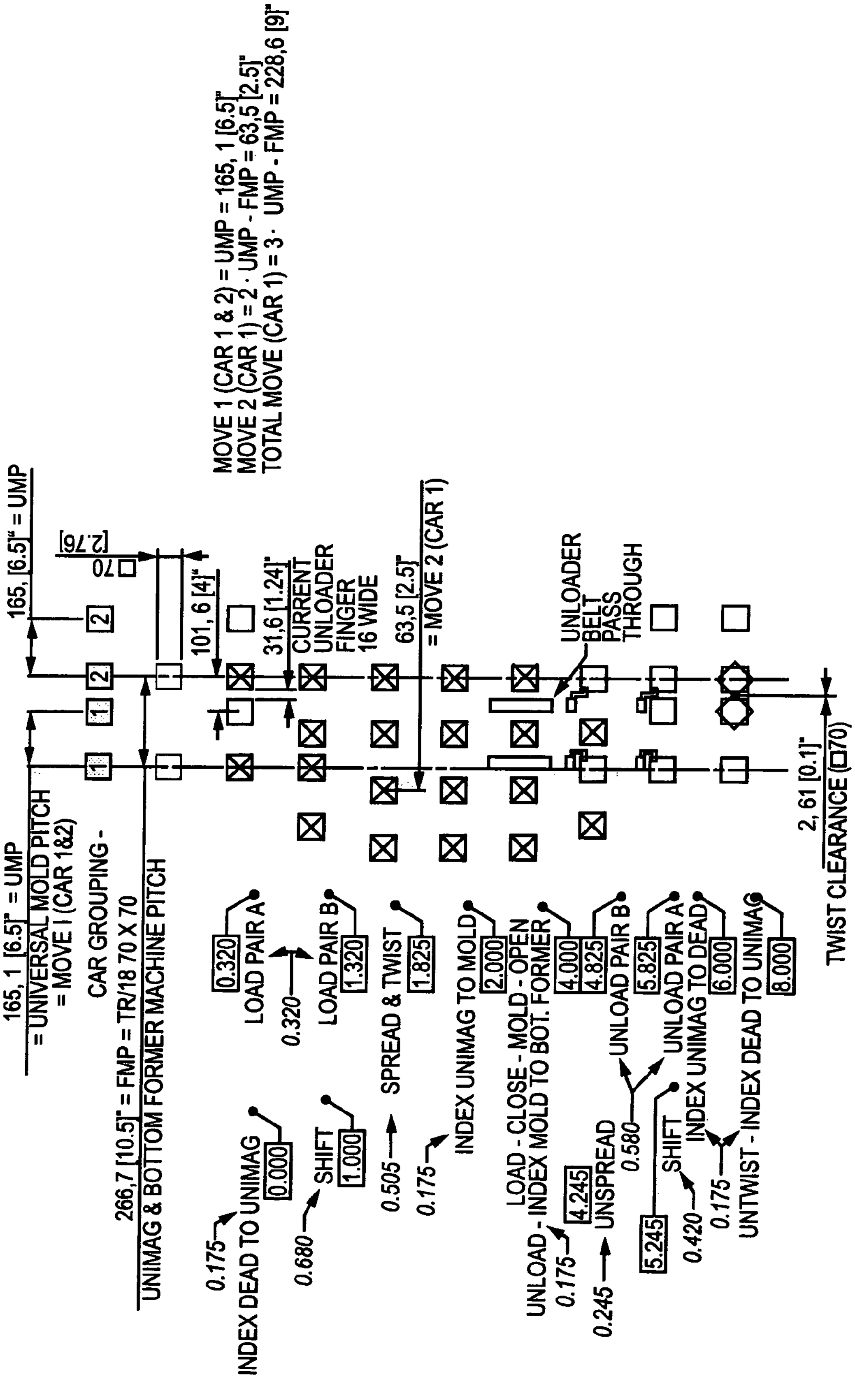
FIG. 19 is an operational map of one embodiment of the transfer unit, the transfer unit being configured for 70 mm by 70 mm cartons and having side-by-side movement cars.

As discussed above, the operational maps of FIGS. 19–23 set forth the different carton, car and hub positions during operation of the transfer unit 20. Referring now to FIG. 19, in this scenario, the cars move together for loading and unloading, rather than in mirror image relation (as in the scenario of FIG. 21). Here, cartons are loaded on the left-hand mandrels of the cars (cars 1 and 2), both cars then shift left and cartons are loaded onto the right-hand mandrels. Car 1 then moves (laterally) to position the mandrels at the universal mold pitch, during which movement the mandrels twist. At this time, the mandrels on car 2 likewise are twisted. Alternately, cars 1 and 2 can both move relative to each other so long as at the termination of movement, the cars are spaced from one another by the universal mold pitch.

The hub then rotates to the second position for inserting the cartons into the mold, the closures are molded and the cartons are moved back onto the transfer unit. The hub then rotates to the third position at which car 1 is moved laterally and the cartons are removed from the right-hand mandrels. The cars then shift right and the cartons are removed from the left-hand mandrels. Following removal of the cartons, the hub is rotated to the fourth (dead) position, after which the mandrels undergo an untwist as they move toward their initial position.

Figure 20:
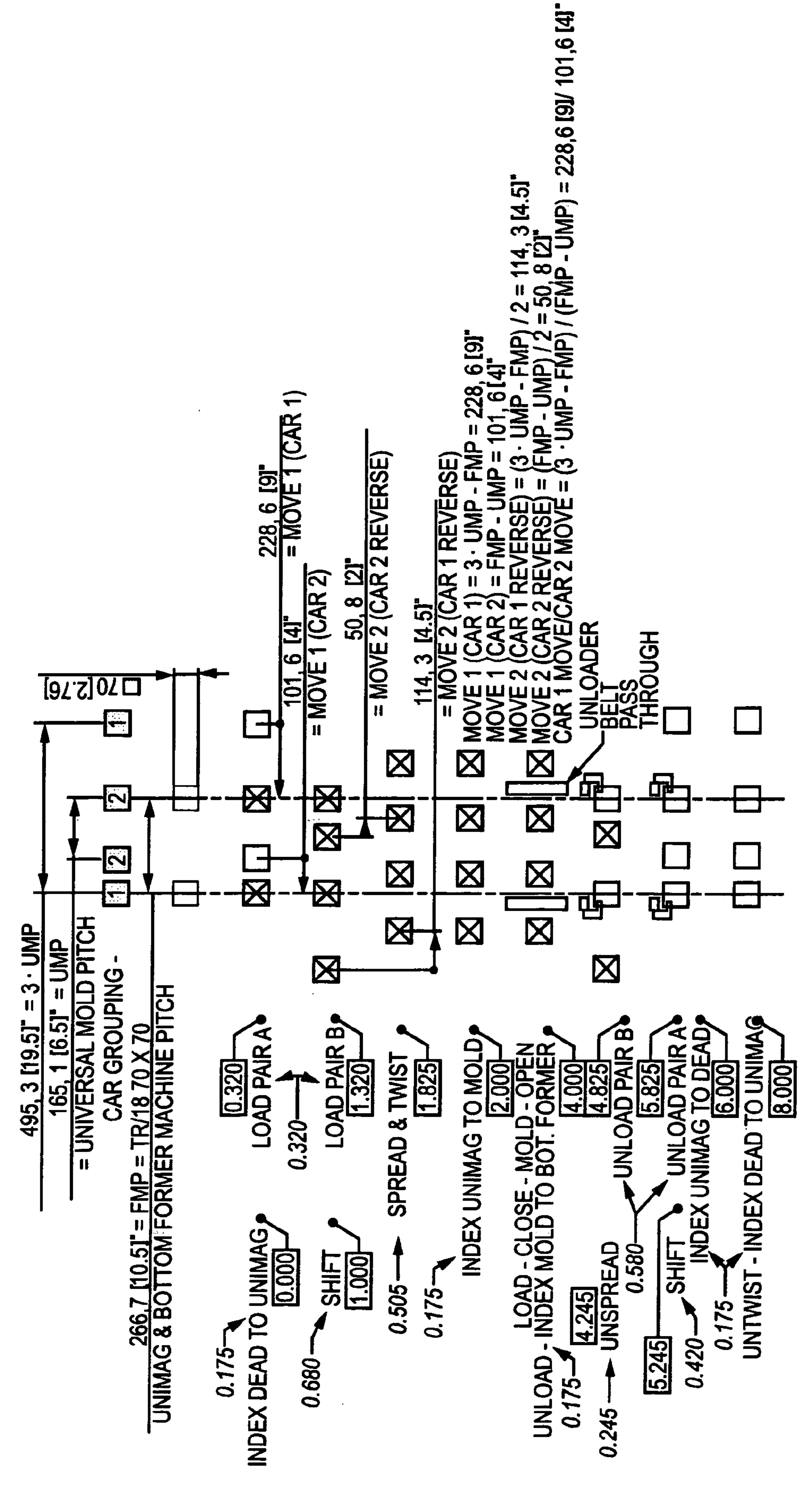
FIG. 20 is an operational map of another embodiment of the transfer unit, the transfer unit being configured for 70 mm by 70 mm cartons and having nested cars.

FIG. 20 illustrates an embodiment of the transfer unit (and an operating cycle) in which the cars are nested. That is, car 1 is larger than car 2 which "fits" within car 1. Cartons are loaded onto the left-hand mandrel of car 1 and the right-hand mandrel of car 2. Both cars then move laterally, but at different rates, (to the left) and cartons are loaded onto the right-hand mandrel of car 1 and the left-hand mandrel of car 2. Both cars then shift right at different rates (to align with the universal mold pitch) which also twists the mandrels to properly position the carton openings.

The hub rotates to the second position for inserting the cartons into the mold, the closures are molded and the cartons moved back onto the transfer unit. The hub then rotates to third position X, and the cars are moved to the left to unload the right-hand mandrel of car 1 and the left-hand mandrel of car 2. The cars then move to the right to unload the left-hand mandrel of car 1 and the right-hand mandrel of car 2. Following unloading, the hub rotates to the fourth (dead) position. As with the other configurations, an untwist operation occurs between quadrants $Q_1$ and $Q_4$.

Figure 22:
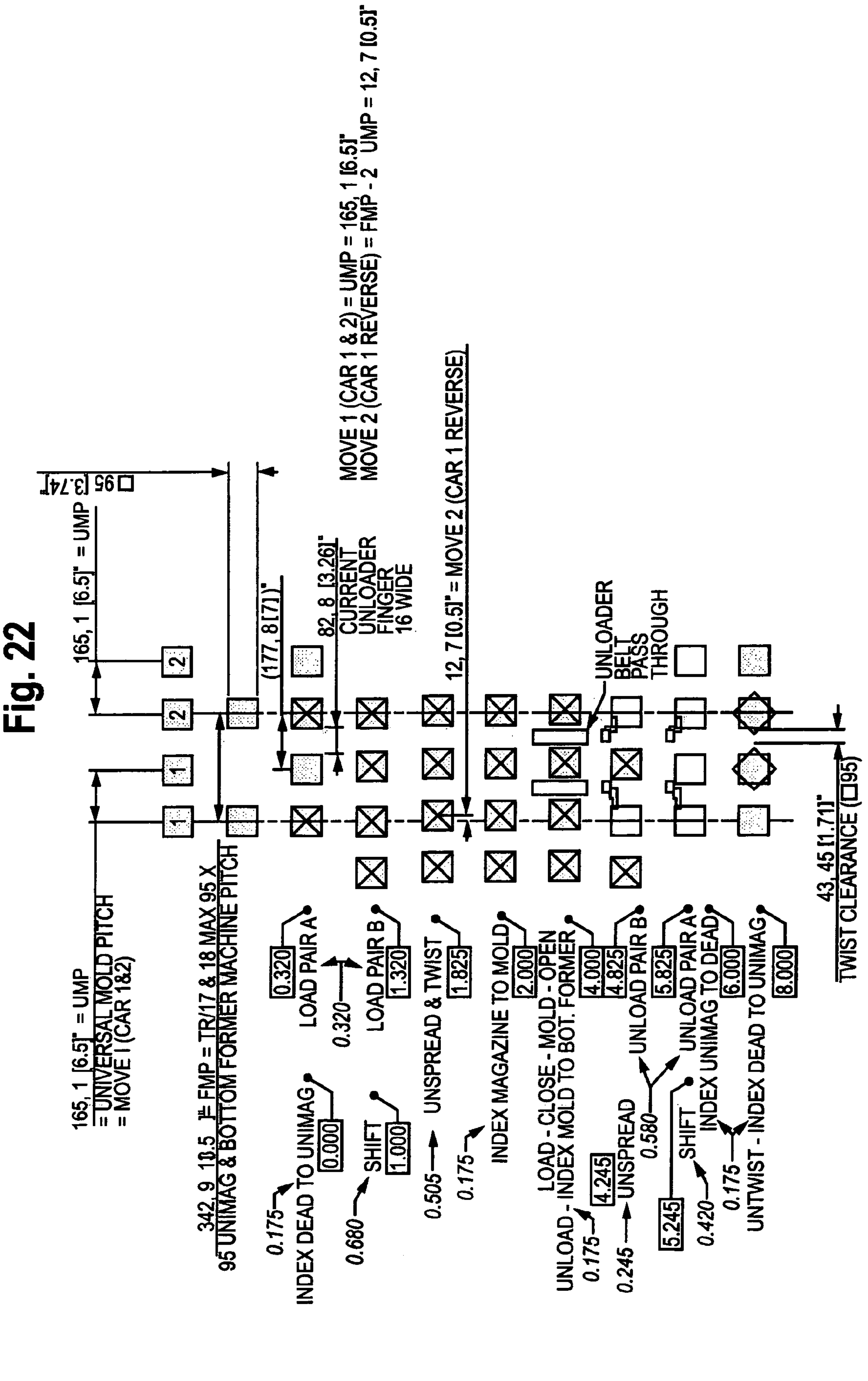
FIG. 22 is an operational map of still another embodiment of the transfer unit, the transfer unit being configured for 95 mm by 95 mm cartons and having side-by-side movement cars (similar to the shown in FIG. 19)
Figure 23:
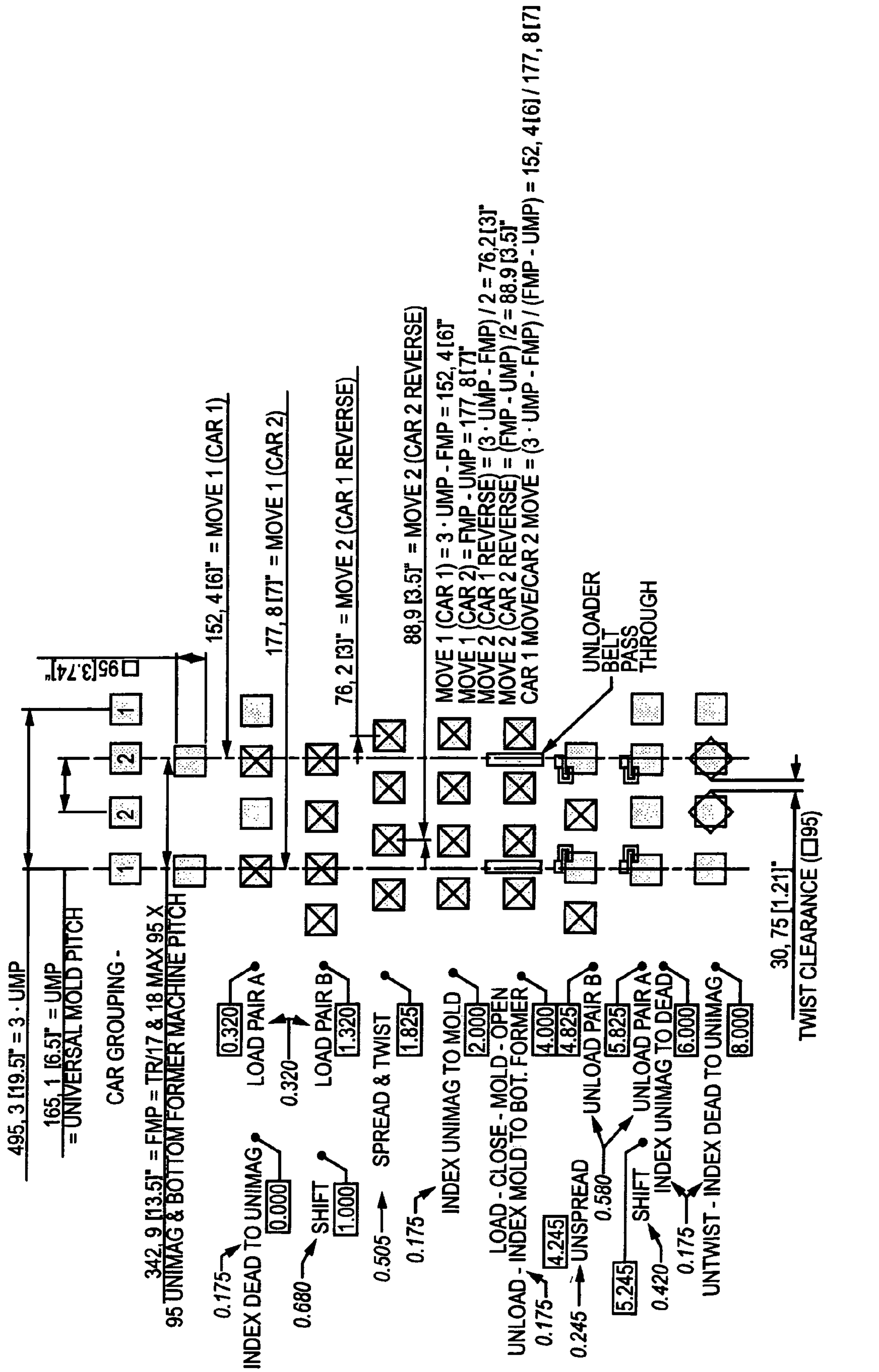
FIG. 23 is an operational map of still another embodiment of the transfer unit, the transfer unit being configured for 95 mm by 95 mm cartons and having nested cars (similar to that shown in FIG. 20).

FIG. 22 is the operating map for an embodiment of the transfer unit for use with 95 mm by 95 mm cartons with side-by-side cars that move together (similar to the operating scenario of that shown in FIG. 19. FIG. 23 is the operating map for an embodiment of the transfer unit for use with 95 mm by 95 mm cartons with nested cars in which car 1 is larger than car 2 and which "fits" within car 1, similar to the operating scenario of that shown in FIG. 20.

FIGS. 17 and 18 illustrate an unloader assembly 124 for moving the cartons C from the transfer unit mandrel 30 to the turret mandrel 22. The assembly 124 includes a drive 126 having a moving belt 128 that rotates about a pair of wheels 130, 132. The assembly 124 further includes a reciprocating finger 134 that is mounted to a bracket 136 that is in turn mounted to the belt 128. The finger 134 reciprocates between a position proximal to the transfer unit mandrels (FIG. 18) or a transfer position and a position proximal to the turret mandrel (FIG. 17) or a transferred position. In the transfer position, the finger 134 engages a carton on the transfer unit mandrel 30 and as the belt 128 rotates, reciprocating the finger 134, it moves the carton to the transferred position, moving the carton C on to the turret mandrel 22.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A drive assembly for longitudinally moving a pair of carrier elements along a hub having a longitudinal axis and rotating about the longitudinal axis, the drive assembly comprising:

a frame;

a rail disposed longitudinally along the hub and spaced from the longitudinal axis, the rail configured to carry the carrier elements;

a ring fixedly mounted to the frame and disposed about the hub, the ring defining a track and including a stationary portion and a rotating portion, the rotating portion being operably connected to a drive;

first and second rotating shafts disposed on the hub, longitudinally spaced from and aligned with one another, the first shaft being a driven shaft and including a head portion disposed at and guided by the ring, the second shaft being an idler shaft;

a continuous, flexible element disposed about the first and second shafts for rotational movement about the shafts, the flexible element, disposed about the shafts, defining opposing elongate sides and return portions at the shafts, the carrier elements being mounted to the flexible element; and the drive mounted to the frame and operably connected to the ring rotating portion for rotating the ring rotating portion, wherein the head portion, traverses along the ring track into the rotating ring portion and is engaged and rotated by the rotating ring portion and wherein rotation of the head portion rotates the flexible element to move the carrier elements along the rail.

2. The drive assembly in accordance with claim 1 wherein the carrier elements are mounted to respective opposing sides of the flexible element and wherein rotation of the element in a first direction drives the carrier elements toward one another and wherein rotation of the element in a second direction drives the carrier elements away from one another.

3. The drive assembly in accordance with claim 2 including a pair of cars each being mounted to opposing sides of the flexible element for opposing movement therewith.

4. The drive assembly in accordance with claim 1 wherein rotation of the flexible element drives the carrier elements in opposing directions from one another.

5. The drive assembly in accordance with claim 1 including rollers mounted to the head portion for traversing along the track.

6. The drive assembly in accordance with claim 1 wherein the ring includes two rotating portions disposed 180 degrees from one another and wherein the head portion is rotated in a first direction at one of the rotating portions and is rotated in a second, opposite direction in the other rotating portion.

7. A drive assembly for effecting movement of an effected element mounted to a hub having a longitudinal axis, the hub configured for rotating about the longitudinal axis, the drive assembly comprising:

a frame;

a ring fixedly mounted to the frame and disposed about the hub, the ring defining a track and including a stationary portion and a rotating portion, the rotating portion being operably connected to a drive;

first and second rotating members disposed on the hub, longitudinally spaced from and aligned with one another, the first member being a driven member and including a head portion disposed at and guided by the ring, the second member being an idler member;

a continuous, flexible element disposed about the first and second members for rotational movement about the members, the flexible element, disposed about the members, the effected element being operably connected to the flexible element; and the drive mounted to the frame and operably connected to the track rotating portion for rotating the track rotating portion, wherein the head portion traverses along the ring track into the rotating track portion and is engaged and rotated by the rotating track portion and wherein rotation of the head portion rotates the flexible element to move the effected element.

8. The drive assembly in accordance with claim 7 wherein the effected element is a car.

* * * * *